United States Patent
Kalia et al.

(10) Patent No.: US 11,928,519 B2
(45) Date of Patent: Mar. 12, 2024

(54) MODERNIZATION OF AN APPLICATION FOR RELATED IMAGE GENERATION

(71) Applicant: International Business Machines Corporation, Armonk, NY (US)

(72) Inventors: Anup Kalia, White Plains, NY (US); Changhua Sun, Beijing (CN); HongLei Guo, Beijing (CN); Zhili Guo, Beijing (CN); Zhong Su, Beijing (CN); Jin Xiao, White Plains, NY (US); Maja Vukovic, New York, NY (US); Shawn Dsouza, Frisco, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 564 days.

(21) Appl. No.: 17/162,069

(22) Filed: Jan. 29, 2021

(65) Prior Publication Data

US 2022/0245000 A1 Aug. 4, 2022

(51) Int. Cl.
*G06F 9/50* (2006.01)
*G06F 9/455* (2018.01)
*G06N 5/025* (2023.01)

(52) U.S. Cl.
CPC ........ *G06F 9/5055* (2013.01); *G06F 9/45529* (2013.01); *G06F 9/5077* (2013.01); *G06N 5/025* (2013.01)

(58) Field of Classification Search
CPC ...... G06F 9/5055; G06F 9/45529; G06F 8/72; G06F 8/76; G06N 5/025
See application file for complete search history.

(56) References Cited

U.S. PATENT DOCUMENTS

| 9,612,765 B2 | 4/2017 | Huang et al. |
| 10,607,042 B1 | 3/2020 | Dasgupta et al. |

(Continued)

FOREIGN PATENT DOCUMENTS

| CN | 111368094 A | 7/2020 |
| KR | 20090117110 A | 11/2009 |
| KR | 20200083053 A | 7/2020 |

OTHER PUBLICATIONS

Shen et al. "Multi-Criteria-based Active Learning for Named Entity Recognition" ACL '04: Proceedings of the 42nd Annual Meeting on Association for Computational Linguistics, Jul. 2004, 8 pages.

(Continued)

*Primary Examiner* — Dong U Kim
(74) *Attorney, Agent, or Firm* — Amin, Turocy & Watson, LLP

(57) ABSTRACT

Systems, computer-implemented methods, and computer program products to facilitate modernization of an application are provided. According to an embodiment, a system can comprise a memory that stores computer executable components and a processor that executes the computer executable components stored in the memory. The computer executable components can comprise a determination component that determines one or more relevant surrounding contexts for a raw entity. The computer executable components also can comprise a matching component that matches the one or more relevant surrounding contexts with one or more known surrounding contexts of one or more known entities. The computer executable components further can comprise a type identification component that identifies an entity type for the raw entity based on the matching of the one or more relevant surrounding contexts with the one or more known surrounding contexts.

20 Claims, 11 Drawing Sheets

(56) References Cited

U.S. PATENT DOCUMENTS

| | | | | |
|---|---|---|---|---|
| 11,385,892 | B1* | 7/2022 | Zhang | G06F 16/9535 |
| 11,500,628 | B1* | 11/2022 | Chawda | G06F 8/77 |
| 11,579,868 | B1* | 2/2023 | Zhang | G06F 8/72 |
| 11,593,103 | B1* | 2/2023 | Chawda | G06F 11/3612 |
| 2018/0091625 | A1* | 3/2018 | Hwang | H04L 41/0897 |
| 2018/0232835 | A1* | 8/2018 | Gordon | G06Q 30/0627 |
| 2018/0267491 | A1* | 9/2018 | Gordon | G05B 9/02 |
| 2019/0205106 | A1 | 7/2019 | Sharma et al. | |
| 2020/0034167 | A1 | 1/2020 | Parthasarathy et al. | |

OTHER PUBLICATIONS

Culotta et al. "Reducing the labeling effort for structured prediction tasks" American Association for Artificial Intelligence, 2005, 6 pages.
Gal et al. "A theoretically grounded application of dropout in recurrent neural networks" 30th Conference on Neural Information Processing Systems (NIPS 2016), Barcelona, Spain, 9 pages.
Shen et al. "Deep Active Learning for Named Entity Recognition" arXiv:1707.05928v3 [cs.CL] Feb. 4, 2018, 15 pages.
"atlassian/bitbucket-server" dockehub, https://hub.docker.com/r/atlassian/bitbucket-server/, Last Accessed Dec. 14, 2020, 9 pages.
Mell, Peter, et al. "The NIST Definition of Cloud Computing." National Institute of Standards and Technology. Sep. 2011. 7 pages.
U.S. Appl. No. 17/087,663, filed Nov. 3, 2020.

* cited by examiner

MODERNIZATION OF AN APPLICATION FOR RELATED IMAGE GENERATION

BACKGROUND

One or more embodiments herein relate generally to modernization of applications, and more specifically, to generation of a container image for an application to be modernized, including entity standardization for one or more raw entities of the application to be modernized.

With reference to one or more embodiments described herein, it will be appreciated that as newer or more modern computer programming languages, software libraries, protocols, hardware platforms and/or the like become more commonplace, existing applications can be modernized for use with these newer or more modern aspects. For example, when desiring to generate a container image, such as a DOCKER® image, for an existing application, and subsequently creating a container from the container image, the respective existing application first can be modernized. In such case, entities utilized by (e.g., comprised by, employed by and/or employed for) the existing application can be standardized to facilitate the modernization. That is, entities utilized by the existing application can be identified and matched with one or more known entities, thereby enabling generation of the container image for the existing application. However, such modernization can result in one or more errors, thereby effecting a request for constituent feedback. In one or more instances, it can be the case that the constituent (e.g., a machine, device, component, hardware, software or human) will not be able to provide the feedback, such as due to lack of data available to the constituent, and/or the feedback can utilize an undesirable number of hours. This method is reactive, as compared to active and/or proactive, and can utilize one or more iterations of constituent feedback, making the application modernization process timely and/or inefficient due at least in part to being partially manually driven between automated data mining operations of computer-readable data.

As an alternative, an active approach can be applied to modernize an existing application. By this approach, training data and/or data mining of textual surrounding contexts, also herein referred to as surrounding contexts, of the application or entities thereof can be assessed prior to requesting constituent feedback. Nonetheless, an active approach can encounter roadblocks including, but not limited to, outdated training data, one or more words being out of vocabulary (OOV) of the training data and/or the application or entities thereof can lack surrounding contexts restricting or altogether preventing the data mining.

SUMMARY

The following presents a summary to provide a basic understanding of one or more embodiments described herein. This summary is not intended to identify key or critical elements, or to delineate any scope of the particular embodiments or any scope of the claims. The sole purpose of the summary is to present concepts in a simplified form as a prelude to the more detailed description that is presented later. In one or more embodiments described herein, devices, systems, computer-implemented methods, apparatus and/or computer program products are described that can facilitate the modernization of an application, including the generation of a container image for an application having one or more raw entities, and including entity standardization for one or more raw entities of the application to be modernized.

According to an embodiment, a system can comprise a memory that stores computer executable components and a processor that executes the computer executable components stored in the memory. The computer executable components can comprise a determination component that determines one or more relevant surrounding contexts for a raw entity. The computer executable components also can comprise a matching component that matches the one or more relevant surrounding contexts with one or more known surrounding contexts of one or more known entities. The computer executable components further can comprise a type identification component that identifies an entity type for the raw entity based on the matching of the one or more relevant surrounding contexts with the one or more known surrounding contexts. An advantage of the system is that it can automatically standardize a raw entity relative to new and modern computer programming languages, software libraries, protocols, hardware platforms and/or the like, without constituent feedback. The system can provide this standardization even in instances where the raw entity is unstructured and thus does not have direct textual context for mining, or where context is provided but a known entity is not discovered in a respective knowledge database being mined.

In some embodiments, the matching component of above system further can determine a selected one of the one or more known entities by prioritizing the one or more relevant surrounding contexts discovered from a plurality of data locations based on a selected order of priority for the plurality of data locations. An advantage of such system is that it can provide selective control of accuracy of the system to return contexts, and thus subsequently determine an entity type for the raw entity, from one or more of the plurality of data locations selected as having, for example, higher quality information, while selectively reducing use of information from other data locations of the plurality of data locations.

According to another embodiment, a computer-implemented method can comprise determining, by a system operatively coupled to a processor, one or more surrounding contexts that are relevant to a raw entity. The computer-implemented method also can comprise matching, by the system, the one or more relevant surrounding contexts with one or more known surrounding contexts of one or more known entities. The computer-implemented method further can comprise identifying, by the system, an entity type for the raw entity based on the matching of the one or more relevant surrounding contexts with the one or more known surrounding contexts. An advantage of the computer-implemented method is that it can automatically standardize a raw entity relative to new and modern computer programming languages, software libraries, protocols, hardware platforms and/or the like, without constituent feedback. The computer-implemented method can provide this standardization even in instances where the raw entity is unstructured and thus does not have direct textual context for mining, or where context is provided but a known entity is not discovered in a respective knowledge database being mined.

In some embodiments, the matching comprised by the above computer-implemented method further can include determining, by the system, a selected one of the one or more known entities by prioritizing the one or more relevant surrounding contexts discovered from a plurality of data locations based on a selected order of priority for the plurality of data locations. An advantage of such computer-implemented method is that it can provide selective control of accuracy of the system to return contexts, and thus subsequently determine an entity type for the raw entity, from one or more of the plurality of data locations selected as having, for example, higher quality information, while selectively reducing use of information from other data locations of the plurality of data locations.

According to yet another embodiment, a computer program product facilitating a process to determine an entity type of a raw entity can comprise a computer readable storage medium having program instructions embodied therewith. The program instructions can be executable, by the processor, to cause the processor to determine, by the processor, one or more relevant surrounding contexts for the raw entity. The program instructions also can be executable, by the processor, to cause the processor to match, by the processor, the one or more relevant surrounding contexts with one or more known surrounding contexts of one or more known entities. The program instructions further can be executable, by the processor, to cause the processor to identify, by the processor, an entity type for the raw entity based on the matching of the one or more relevant surrounding contexts with the one or more known surrounding contexts. An advantage of the computer program product is that it can automatically standardize a raw entity relative to new and modern computer programming languages, software libraries, protocols, hardware platforms and/or the like, without constituent feedback. The computer program product can provide this standardization even in instances where the raw entity is unstructured and thus does not have direct textual context for mining, or where context is provided but a known entity is not discovered in a respective knowledge database being mined.

In some embodiments, the above computer program product further can comprise program instructions that can be executable, by the processor to cause the processor to determine, by the processor, a selected one of the one or more known entities by prioritizing the one or more relevant surrounding contexts discovered from a plurality of data locations based on a selected order of priority for the plurality of data locations. An advantage of such computer program product is that it can provide selective control of accuracy of the system to return contexts, and thus subsequently determine an entity type for the raw entity, from one or more of the plurality of data locations selected as having, for example, higher quality information, while selectively reducing use of information from other data locations of the plurality of data locations.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in this Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the aforementioned problems with modernization of existing applications for use with new or modern computer programming languages, software libraries, protocols, hardware platforms and/or the like, one or more embodiments described herein can be implemented to produce a solution to one or more of these problems. The solution can be provided in the form of one or more systems, computer-implemented methods and/or computer program products that can facilitate the following processes: a) application modernization of an existing application; b) standardization of one or more raw entities (i.e., unknown entities) of the existing application, including determination of an entity type (e.g., application, language, browser, operating system (OS), software type and/or the like) for one or more of the raw entities of the existing application, and/or including determination of entity relationships to one or more other entities (e.g., various functions of the entity, what language an entity is written in and/or is compatible with, what entity type an entity is, what entity or entity type an entity is similar to, how an entity is hosted, accessed and/or installed and/or like function); and/or c) generation of knowledge graphs for the one or more raw entities and for one or more known entities to be compared to the one or more raw entities. That is, embodiments described herein include one or more systems, computer-implemented methods, apparatuses and computer program products that facilitate one or more of the aforementioned processes. An advantage of the one or more systems, computer-implemented methods and/or computer program products is that they can automatically standardize a raw entity relative to new and modern computer programming languages, software libraries, protocols, hardware platforms and/or the like, without constituent feedback. The one or more systems, computer-implemented methods and/or computer program products can provide this standardization even in instances where the raw entity is unstructured and thus does not have direct textual context for mining, or where context is provided but a known entity is not discovered in a respective knowledge database.

Figure 1:
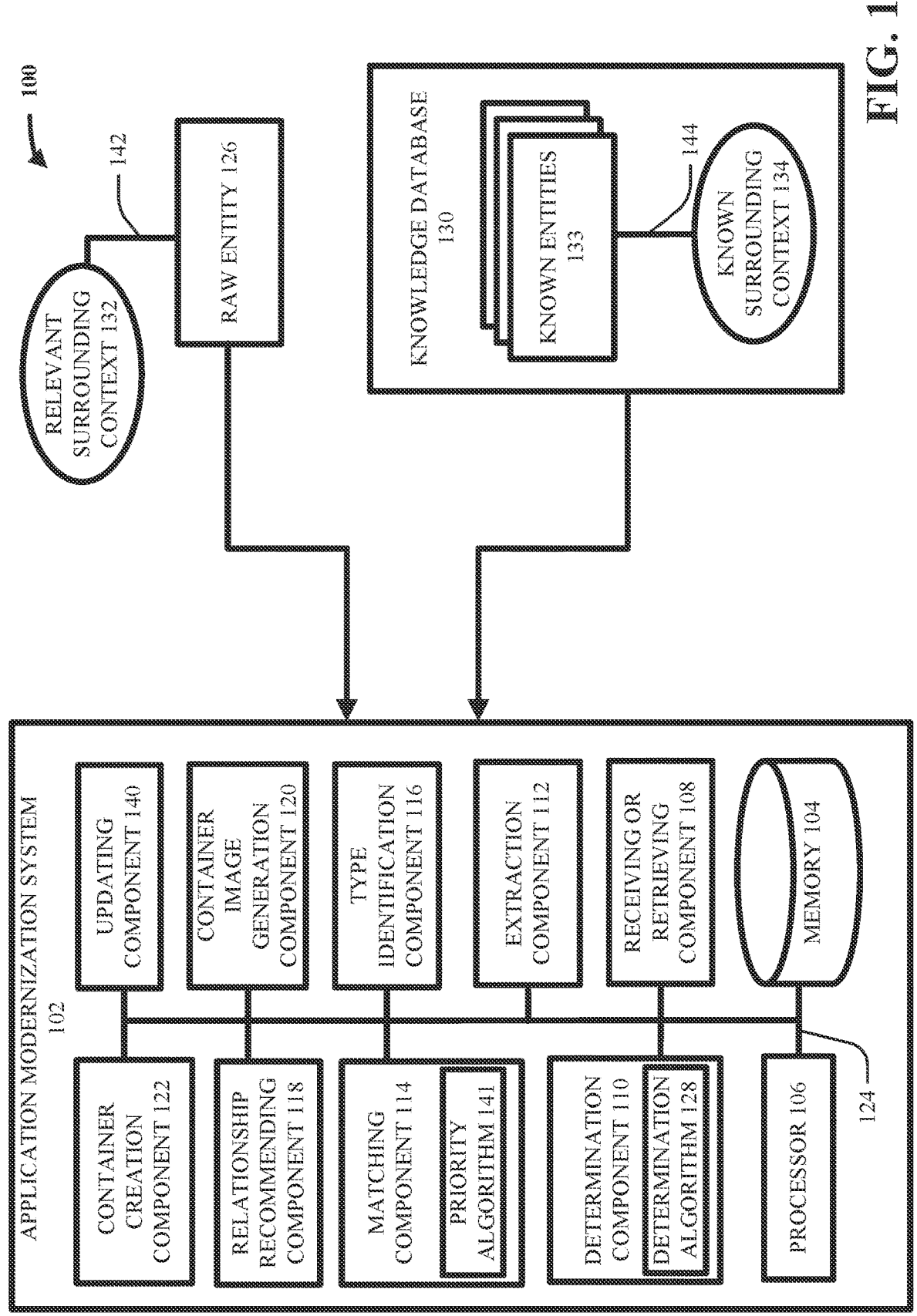
FIG. 1 illustrates a block diagram of an example, non-limiting system that can facilitate the modernization of an application, in accordance with one or more embodiments described herein.

Turning now in particular to one or more figures, and first to FIG. 1, the figure illustrates a block diagram of an example, non-limiting system 100 that facilitates modernization of an existing application in accordance with one or more embodiments described herein. The system 100 can comprise an application modernization system 102, which can be associated with a cloud computing environment. For example, the application modernization system 102 can be associated with a cloud computing environment 1050 described below with reference to FIG. 10 and/or with one or more functional abstraction layers described below with reference to FIG. 11 (e.g., hardware and software layer 1160, virtualization layer 1170, management layer 1180 and/or workloads layer 1190).

Application modernization system 102 and/or components thereof (e.g., determination component 110, matching component 114, type identification component 116, relationship recommending component 118) can employ one or more computing resources of the cloud computing environment 1050 described below with reference to FIG. 10 and/or the one or more functional abstraction layers (e.g., quantum software and/or the like) described below with reference to FIG. 11 to execute one or more operations in accordance with one or more embodiments described herein. For example, cloud computing environment 1050 and/or one or more of the functional abstraction layers 1160, 1170, 1180 and/or 1190 can comprise one or more classical computing devices (e.g., classical computer, classical processor, virtual machine, server and/or the like), quantum hardware and/or quantum software (e.g., quantum computing device, quantum computer, quantum processor, quantum circuit simulation software, superconducting circuit and/or the like) that can be employed by application modernization system 102 and/or components thereof to execute one or more operations in accordance with one or more embodiments described herein. For instance, application modernization system 102 and/or components thereof can employ one or more classical and/or quantum computing resources to execute one or more classical and/or quantum: mathematical functions, calculations and/or equations; computing and/or processing scripts; algorithms; models (e.g., artificial intelligence (AI) models, machine learning (ML) models, deep learning (DL) models and/or another like model); and/or another operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth and active user accounts). Resource usage can be monitored, controlled and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage or individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems or storage, but has control over the deployed applications and possibly application hosting environment configurations.

Infrastructure as a Service (IaaS): the capability provided to the consumer is to provision processing, storage, networks and/or other fundamental computing resources where the consumer is able to deploy and run arbitrary software, which can include operating systems and applications. The consumer does not manage or control the underlying cloud infrastructure but has control over operating systems, storage, deployed applications and/or possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy and/or compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community or public) that remain unique entities but are bound together by standardized or proprietary technology that enables data and application portability (e.g., cloud bursting for load-balancing between clouds).

A cloud computing environment is service oriented with a focus on statelessness, low coupling, modularity and/or semantic interoperability. At the heart of cloud computing is an infrastructure that includes a network of interconnected nodes.

Moreover, the system 100 can be associated with or be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system and/or the like. In accordance therewith, the system 100 can be employed to use hardware and/or software to solve problems that are highly technical in nature, that are not abstract and/or that cannot be performed as a set of mental acts by a human.

Application modernization system 102 can comprise a memory 104, a processor 106, a determination component 110, a matching component 114 and/or a type identification component 116. Application modernization system 102 also can comprise a receiving or retrieving component 108, an extraction component 112, a relationship recommending component 118, a container image generation component 120, a container creation component 122 and/or an updating component 140.

It should be appreciated that the embodiments depicted in various figures disclosed herein are for illustration only, and as such, the architecture of such embodiments is not limited to the systems, devices and/or components depicted therein, nor to any particular order, connection and/or coupling of such systems, devices and/or components depicted therein. For example, in some embodiments, system 100 and/or application modernization system 102 can further comprise various computer and/or computing-based elements described herein with reference to operating environment 900 and FIG. 9. In several embodiments, such computer and/or computing-based elements can be used in connection with implementing one or more of the systems, devices, components and/or computer-implemented operations shown and described in connection with FIG. 1 or with other figures disclosed herein.

Memory 104 can store one or more computer and/or machine readable, writable and/or executable components and/or instructions that, when executed by processor 106 (e.g., a classical processor, a quantum processor and/or the like), can facilitate performance of operations defined by the executable component(s) and/or instruction(s). For example, memory 104 can store computer and/or machine readable, writable and/or executable components and/or instructions that, when executed by processor 106, can facilitate execution of the various functions described herein relating to application modernization system 102, determination component 110, matching component 114, type identification component 116 and/or another component associated with application modernization system 102 as described herein with or without reference to the various figures of the one or more embodiments.

Memory 104 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM) and/or the like) that can employ one or more memory architectures. Further examples of memory 104 are described below with reference to system memory 916 and FIG. 9. Such examples of memory 104 can be employed to implement any one or more embodiments described herein.

Processor 106 can comprise one or more types of processors and/or electronic circuitry (e.g., a classical processor, a quantum processor and/or the like) that can implement one or more computer and/or machine readable, writable and/or executable components and/or instructions that can be stored on memory 104. For example, processor 106 can perform various operations that can be specified by such computer and/or machine readable, writable and/or executable components and/or instructions including, but not limited to, logic, control, input/output (I/O), arithmetic and/or the like. In some embodiments, processor 106 can comprise one or more central processing unit, multi-core processor, microprocessor, dual microprocessors, microcontroller, System on a Chip (SOC), array processor, vector processor, quantum processor and/or another type of processor. Additional examples of processor 106 are described below with reference to processing unit 904 and FIG. 9. The examples of processor 106 can be employed to implement any one or more embodiments described herein.

Application modernization system 102, memory 104, processor 106, determination component 110, matching component 114, type identification component 116 and/or another component of application modernization system 102 as described herein can be communicatively, electrically, operatively and/or optically coupled to one another via a bus 124 to perform functions of system 100, application modernization system 102 and/or any components coupled therewith. Bus 124 can comprise one or more memory bus, memory controller, peripheral bus, external bus, local bus, a quantum bus and/or another type of bus that can employ various bus architectures. Further examples of bus 124 are described below with reference to system bus 908 and FIG.

9. The examples of bus 124 can be employed to implement any one or more embodiments described herein.

Application modernization system 102 can comprise any type of component, machine, device, facility, apparatus and/or instrument that comprises a processor and/or can be capable of effective and/or operative communication with a wired and/or wireless network. All such embodiments are envisioned. For example, application modernization system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players and/or another type of device.

Application modernization system 102 can be coupled (e.g., communicatively, electrically, operatively, optically and/or similar) to one or more external systems, sources and/or devices (e.g., classical and/or quantum computing devices, communication devices and/or similar devices) via a data cable (e.g., High-Definition Multimedia Interface (HDMI), recommended standard (RS) 232, Ethernet cable and/or the like). In some embodiments, application modernization system 102 can be coupled (e.g., communicatively, electrically, operatively, optically and/or similar) to one or more external systems, sources and/or devices (e.g., classical and/or quantum computing devices, communication devices and/or similar devices) via a network.

In some embodiments, a network can comprise one or more wired and/or wireless networks, including, but not limited to, a cellular network, a wide area network (WAN) (e.g., the Internet), or a local area network (LAN). For example, application modernization system 102 can communicate with one or more external systems, sources and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol and/or other proprietary and/or non-proprietary communication protocols. In a related example, application modernization system 102 can include hardware (e.g., a central processing unit (CPU), a transceiver, a decoder, quantum hardware, a quantum processor and/or similar hardware), software (e.g., a set of threads, a set of processes, software in execution, quantum pulse schedule, quantum circuit, quantum gates and/or the like) and/or a combination of hardware and software that facilitates communicating information between application modernization system 102 and external systems, sources and/or devices (e.g., computing devices, communication devices and/or similar devices).

Application modernization system 102 can comprise one or more computer and/or machine readable, writable and/or executable components and/or instructions that, when executed by processor 106 (e.g., a classical processor, a quantum processor and/or similar processor), can facilitate performance of one or more operations defined by such component(s) and/or instruction(s). Further, in numerous embodiments, any component associated with application modernization system 102, as described herein with or without reference to the various figures of the one or more embodiments, can comprise one or more computer and/or machine readable, writable and/or executable components and/or instructions that, when executed by processor 106, can facilitate performance of one or more operations defined by such component(s) and/or instruction(s). For example, determination component 110, matching component 114, type identification component 116 and/or any other components associated with application modernization system 102 as disclosed herein (e.g., communicatively, electronically, operatively and/or optically coupled with and/or employed by application modernization system 102), can comprise such computer and/or machine readable, writable and/or executable component(s) and/or instruction(s). Consequently, according to numerous embodiments, application modernization system 102 and/or any components associated therewith as disclosed herein, can employ processor 106 to execute such computer and/or machine readable, writable and/or executable component(s) and/or instruction (s) to facilitate performance of one or more operations described herein with reference to application modernization system 102 and/or any such components associated therewith.

Application modernization system 102 can facilitate (e.g., via processor 106) performance of operations executed by and/or associated with determination component 110, matching component 114, type identification component 116 and/or another component associated with application modernization system 102 as disclosed herein. For instance, as described in detail below, application modernization system 102 can facilitate via processor 106 (e.g., a classical processor, a quantum processor and/or a similar processor): standardization of one or more raw entities 126 (entities) identified from the application to be modernized. The standardization can comprise determining one or more relevant surrounding contexts 132 that are relevant to a raw entity 126 and matching the one or more relevant surrounding contexts 132 with one or more known surrounding contexts 134 of one or more known entities 133 based on a similarity assessment, to be described below in detail.

In another example, as described in detail below, the application modernization system 102 can further facilitate via processor 106 (e.g., a classical processor, a quantum processor and/or a similar processor): receiving or retrieving a raw entity 126 of an existing application to be modernized; applying an algorithm to the raw entity 126; determining by the algorithm whether the raw entity 126 is known or unknown relative to one or more knowledge databases 130 accessible to the application modernization system 102; determining one or more relevant surrounding contexts 132 that are relevant to the raw entity 126; extracting the one or more relevant surrounding contexts 132; determining one or more known surrounding contexts 134 of one or more known entities 133; extracting the one or more known surrounding contexts 134; comparing the one or more relevant surrounding contexts 132 and the one or more known surrounding contexts 134; matching the one or more relevant surrounding contexts 132 with the one or more known surrounding contexts 134; identifying an entity type for the raw entity 126; and/or recommending one or more entity relationships relative to the raw entity 126, the one or more known entities 133 and/or one or more additional known or previously unknown entities. As will be apparent from the below, surrounding contexts of an entity, whether known or raw, can include textual data underlying the respective entity, such as gathered from documents related to, but not limited to, the respective programming language, runtime, runlib, library, plugin(s), OS, application server and/or a parent application.

Turning now to additional components of the application modernization system 102 as illustrated in FIG. 1, further functionality of the application modernization system 102 will be described. Additional description of functionalities will be further described below with reference to the example embodiments of FIGS. 3-5, where repetitive description of like elements and/or processes employed in respective embodiments is omitted for sake of brevity.

The receiving or retrieving component 108 can employ any one or more aspects of an operating environment, such as the operating environment 900 (FIG. 9), to receive or retrieve one or more raw entities 126 from the existing application to be modernized. By way of a non-limiting example, a raw entity 126 can be uploaded from the HDD 914, received from the memory/storage 952 via the WAN 956 and/or downloaded via the WAN 956 from a node, such as a cloud computing node 1010 of a cloud computing environment 1050 (FIG. 10).

The following description refers to the standardization of a single raw entity 126. However, it will be appreciated that the receiving or retrieving component 108 can simultaneously, subsequently or in any suitable order receive a plurality of raw entities 126 identified from the application to be modernized for entity standardization of the plurality of raw entities 126. It also will be appreciated that where more than one raw entity 126 is to be standardized, such as via the matching component 114, type identification component 116 and/or relationship recommending component 118, the application modernization system 102 can facilitate the standardization of the raw entities 126 in any suitable order and/or can facilitate the standardization of any number of raw entities 126 simultaneously. As used herein, the process of standardization of a raw entity 126 can include at least one or more of the processes performed by the receiving or retrieving component 108, determination component 110, extraction component 112, matching component 114, type identification component 116 and/or relationship recommending component 118.

Upon the receiving or retrieving component 108 receiving or retrieving the raw entity 126, communication of the receiving or retrieving component 108 with the determination component 110 alerts the determination component 110 of an identified raw entity 126. The determination component 110, having been alerted of the raw entity 126, can utilize a determination algorithm 128 to mine and process data from one or more knowledge databases 130, as will be explained in detail. The purpose of this mining and processing is to determine if the raw entity 126 is known or unknown in the one or more knowledge databases 130.

First, it will be appreciated that the determination algorithm 128 can be stored internally or externally by the application modernization system 102, such as in a drive or in the memory 104. Additionally, or alternatively, the determination algorithm 128 can be stored or accessible via a node of a cloud computing environment, such as a cloud computing node 1010 of the cloud computing environment 1050 illustrated at FIG. 10.

A knowledge database 130 can comprise textual data from one or more documents, such as files, scripts, code, operation logs, tickets, git issues and/or other information technology (IT) documents, related to programming language, runtime, runlib, library, plugin(s), OS, application server and/or a parent application with reference to one or more known entities 133, entity types and/or entity relationships. In many knowledge databases, each entity can have an entity type, such as application, language, browser, operating system (OS), software type and/or the like, associated therewith, such that the entity and its associated entity type are indicated therein as a key value pair. By way of example, but not limitation, an entity relationship can indicate various functions of the entity, what language an entity is written in and/or is compatible with, what entity type an entity is, what entity or entity type an entity is similar to, how an entity is, e.g., hosted, accessed and/or installed. A knowledge database 130 can be stored internally or externally by the application modernization system 102, such as in a drive or in the memory 104. It will be appreciated that a knowledge database 130 can included information related to and reference one or more known entities 133 but also not digitally or otherwise contain the one or more known entities 133.

For example, a knowledge database 130 can be continually updated by the updating component 140 based on processes performed by the processor 106, including, but not limited to, modernization of existing applications and standardization of related raw entities. In some instances, discovery of entities, entity types and/or entity relationships that were not previously comprised by the knowledge database 130 can be added thereto by the updating component 140. As will be described below, these discoveries can be made by the relationship recommending component 118, for example. In other instances, the knowledge database 130 can be respectively updated with such new entities, entity types and/or entity relationships by an external constituent having access to and/or control over the respective knowledge database 130. Accordingly, a knowledge database 130 can be stored at or be accessible via a node of a cloud computing environment, such as a cloud computing node 1010 of the cloud computing environment 1050 illustrated at FIG. 10. Examples of knowledge databases 130 can include wiki data sources, STACK OVERFLOW® and/or like database.

Turning again to the functionalities and processes of the determination component 110, in one or more embodiments, the determination algorithm 128 can cause the determination component 110 to access one or more knowledge databases 130, and to mine data therein and/or from the raw entity 126. For example, the determination algorithm 128 can direct the determination component 110 to determine one or more relevant surrounding contexts 132 from data underlying the raw entity 126 and/or from one or more knowledge databases 130. That is, the determination algorithm 128 can direct the determination component 110 to determine one or more relevant surrounding contexts 132, e.g., provided in any computer language and/or numerically presented that provides a textual indication of an entity name, entity type and/or entity relationship related to the existence, use and/or function of the raw entity 126. For example, the one or more relevant surrounding contexts 132 can include, but are not limited to, textual data from one or more documents, such as files, scripts, code, operation logs, tickets, git issues and/or other information technology (IT) documents related to programming language, runtime, runlib, library, plugin(s), OS, application server and/or a parent application. The one or more relevant surrounding contexts 132 can be structured or unstructured. In some instances, the determination algorithm 128 can be based on a multilabel classifier, such as constructed using a training dataset having a set of raw inputs (entities) and labels (entity types and entity relationships) mapped to the inputs, such as being represented in the format of a knowledge graph. In some instances, the determination algorithm can employ natural language understanding (NLU) tools and/or name entity recognition (NER) tools, with results thereof being merged to determine and or generate the relevant surrounding contexts 132.

In some instances, the determination algorithm 128 can determine from the mined one or more relevant surrounding contexts 132 that enough information is gathered regarding the raw entity 126 to identify it as a known entity. For example, the determination algorithm 128 can determine that the respective one or more knowledge databases 130 are exhausted of available results, e.g., known surround contexts 134. That is, the mining performed by the determination component 110 can be limited to an initial corpus relative to the raw entity 126. In some embodiments, the determination algorithm 128 can direct the determination component 110 to indicate that the raw entity 126 is known. In an embodiment in which the determination component 110 provides an indication that the raw entity 126 is a known entity, the raw entity 126 can be labeled as a known entity by the determination component 110 and can be utilized in an operating environment employing new or modern computer programming languages, software libraries, protocols, hardware platforms and/or the like, for example, to generate a container image for the application to be modernized, as will be described below in detail.

Alternatively, the determination algorithm 128 can determine from the mined one or more relevant surrounding contexts 132, and/or from the inability to locate data to mine either from the raw entity 126 and/or from the one or more knowledge databases, that sufficient information has not been gathered regarding the raw entity 126, such that the raw entity 126 cannot be identified at all by the determination algorithm. In other instances, the determination component 110 can determine according to the determination algorithm 128 that a selectively determined confidence level is not met with respect to the one or more relevant surrounding contexts 132 that were mined. Accordingly, the determination algorithm 128 can direct the determination component 110 to indicate that the raw entity 126 is unknown.

In such case, the determination component 110 can be directed by the determination algorithm 128 to further mine the one or more knowledge databases 130 to identify one or more known surrounding contexts 134 of one or more known entities 133. Data regarding the one or more known entities 133, such as one or more known surrounding contexts 134 can be comprised by the one or more knowledge databases 130. The one or more known surrounding contexts 134 can include, but are not limited to, textual data from one or more documents, such as files, scripts, code, operation logs, tickets, git issues and/or other information technology (IT) documents related to programming language, runtime, runlib, library, plugin(s), OS, application server and/or a parent application. The one or more known surrounding contexts 134 can be structured or unstructured. The determination algorithm 128 can direct the determination component 110 to determine one or more known surrounding contexts 134 provided in any computer language, numerically presented and/or the like that provides a textual indication of an entity name, entity type and/or entity relationship related to the existence, use and/or function of the one or more known entities 133. Additionally, it will be appreciated that mining of the one or more knowledge databases 130 to identify the one or more known surrounding contexts 134 can be performed at any time relative to the mining of the one or more knowledge databases 130 to identify the one or more relevant surrounding contexts 132.

Concurrently or subsequently, the extraction component 112 can extract the one or more relevant surrounding contexts 132 and the one or more known surrounding contexts 134 to be analyzed by the matching component 114. To extract the aforementioned one or more relevant and known surrounding contexts 132 and 134, the extraction component 112 can pull data using any suitable extraction method and/or extraction software accessible to the extraction component 112. By way of example, but not limitation, extraction methods and/or extraction software that the extraction component 112 can employ to extract the relevant surrounding contexts 132 and the one or more known surrounding contexts 134 can include, e.g., downloading, uploading and/or copying, temporarily or permanently, of these surrounding contexts 132 and 134 to any suitable memory or other storage, such as the memory 104 and/or external storage 916, HDD 914 and/or remote memory/storage 952 illustrated at the operating environment 900 illustrated at FIG. 9. By way of another example, but not limitation, these surrounding contexts can be additionally, or alternatively, translated to a particular programming language or set of numerical values by the extraction component 112, which translated aspects likewise can be downloaded, uploaded, copied and/or the like, temporarily or permanently, to any suitable memory or other storage.

Based on the extracted ones of the one or more relevant surrounding contexts 132 of the raw entity 126 and the one or more known surrounding contexts 134 of the one or more known entities 133, the matching component 114 can perform a similarity assessment, such as using a priority algorithm 141. That is, generally, the matching component 114 can compare and match the one or more relevant surrounding contexts 132 and the one or more known surrounding contexts 134. By way of example, but not limitation, the similarity assessment can include the below-described processes of analysis of the one or more relevant and known surrounding contexts 132 and 134, generation of one or more knowledge graphs and/or comparison and matching of the one or more knowledge graphs according to the priority algorithm 141.

Turning first to the analysis of the one or more relevant and known surrounding contexts 132 and 134, these contexts, having been extracted, can be assessed to determine information regarding the raw entity 126 regarding its relationships to other entities and/or entity types. By way of example, but not limitation, these entity relationships can include various functions of the entity, what language an entity is written in and/or is compatible with, what entity type an entity is, what entity or entity type an entity is similar to, how an entity is hosted, accessed and/or installed and/or similar function.

For example, a plurality of relevant surrounding contexts 132 can be used by the matching component 114 to generate a knowledge graph for the raw entity 126 including the raw entity 126 and including one or more vectors connecting the raw entity 126 to one or more of the entities and/or entity types. Vector representations of the relationships can include indications that the raw entity 126 "is a", "can be installed on", "is similar to", "is written in", "runs on", "can be hosted on", "can be accessed from", "can commit changes via" and/or like relationship relative to one or more other entities and/or entity types. For example, an "is a" relationship can be "is a software", "is a version control repository" or "is a shell extension". In other embodiments, these entity relationships can be represented in any other suitable format.

Concurrently and/or subsequently, a plurality of known surrounding contexts 134 can be used by the matching component 114 to generate one or more additional knowledge graphs for the one or more known entities 133. Each of the additional knowledge graphs can include a respective known entity 133 and vectors connecting the respective known entity 133 to one or more of the aforementioned entities and/or entity types.

The matching component 114 additionally can perform the similarity assessment to compare and match the one or more relevant surrounding contexts 132 and the one or more known surrounding contexts 134, via employing the raw entity knowledge graph and the one or more additional knowledge graphs. This comparison and matching can employ the priority algorithm 141 resulting in the priority algorithm 141 directing the matching component 114 to indicate a selected one of the one or more known entities 133 that is most similar to the raw entity 126. For example, the selected one of the one or more known entities 133 can have associated therewith one of the additional knowledge graphs that is most similar to the raw entity knowledge graph. That is, the selected one of the known entities 133 can have related data, such as entity types and entity relationships associated therewith, that are most similar to entity types and entity relationships associated with the raw entity 126. This similarity can be determined using the priority algorithm 141, to be detailed next.

By way of an example, via the priority algorithm 141, the matching component 114 can determine a selected one of the one or more known entities 133 by prioritizing relevant and known surrounding contexts 132 and 134, represented as entity types and entity relationships in the respective knowledge graphs, with respect to the data location from which each of the relevant and known surrounding contexts 132 and 134 was discovered. That is, the plurality of data locations previously mined for these contexts can be prioritized in a selected order of priority, where this order of priority can be employed by the matching component 114 when determining similarity between the knowledge graphs. For example, common entity types and/or entity relationships between knowledge graphs can be an indication of similarity between the respective entities, and priority can be given to common entity types and/or entity relationships depending on their respective data locations of discovery of a plurality of data locations. By way of an example, but not limited thereto, an example order of priority can employ a plurality of levels (e.g., groupings) of various document type data locations. In this example, the order of priority can include giving first priority to a group including runtime, programming, application server and/or parent application documents, second priority to a group including library, runlib and/or plugin documents, and third priority to OS documents. In some instances, the OS documents can be of a higher level of description and instruction relative to the document types of the example first and second priorities. In some instances OS-related contexts can occur more frequently in a respective knowledge database than contexts related to library and plugin documents, for example. In numerous other embodiments, different data locations, different groupings and/or different prioritized order of the data locations can be employed.

The selected order of priority can be comprised by the priority algorithm 141 and can be selectively modified by a constituent. By way of an example, a human user can modify the priority algorithm 141 through use of a respective user interface, such as the keyboard 938, touch screen 940 and/or mouse 942 of the operating environment 900 of FIG. 9.

Further, the priority algorithm 141 can direct employment of one or more thresholds and/or gates than can be selectively set and/or augmented, such as by a constituent by way of the aforementioned modification. Any one or more of these thresholds and/or gates can be employed before, concurrent with and/or after the aforementioned prioritization is employed. For example, a percentage of total match or percentage confidence threshold can be employed and/or a hard positive or hard negative can be employed, related to any one or more exemplary known entities, entity types and/or entity relationships, such as employed relative to all raw entities, relative to the particular exemplary raw entity 126 and/or relative to any selected category of raw entities. Additionally, or alternatively, the thresholds and/or gates can be different with respect to each of various data locations or levels of data locations.

In connection with the mining of the one or more knowledge databases 130 and raw entity 126, where a relevant surrounding context 132 cannot be matched with any existing entity in the knowledge database 130, the determination algorithm 128 can direct the determination component 110 to iteratively mine the one or more knowledge databases 130 and the raw entity 126 to extract additional relevant surrounding contexts surrounding the unmatched relevant surrounding context 132. The additional relevant surrounding contexts can then be extracted, via the extraction component 112 and a similarity assessment performed by the matching component 114, such as using the priority algorithm 141. Accordingly, this iterative process can, in connection with updating of the knowledge databases performed by the updating component 140, enable additional entities, entity types and/or entity relationships to be learned, with respect to the one or more knowledge databases 130.

The matching component 114 also can determine a selected one of the known entities 133 that is most similar to the raw entity 126, based on the priority algorithm 141 and the generated knowledge graphs. In one example, numerical rankings can be given to each assessed known entity 133, such as based on common entity types and/or entity relationships with the raw entity 126, where rankings can be modified, and/or additional rankings provided, based on the respective discovery data locations of the common entity types and/or entity relationships. For example, an assessed known entity 133 can be assigned a higher numerical ranking than other known entities 133 in view of having related therewith a greater quantity of matched, known surround contexts 134 minded from top priority data locations (according to the priority algorithm 141). Additionally, or alternatively, a highest or lowest ranked known entity 133 can be identified by the priority algorithm 141 as the selected known entity 133.

Referring still to FIG. 1, the type identification component 116 can identify an entity type for the raw entity 126 based on the matching performed by the matching component 114. For example, the type identification component 116 can identify the type for the raw entity 126 to be the entity type (or one of the entity types if a known entity 133 has more than one entity type) of the selected one of the one or more known entities 133, matched to the raw entity 126 by the matching component 114. For example, an entity type of the chosen known entity 133 can be an application, a language, a browser, an operating system (OS), a software type and/or the like.

The relationship recommending component 118, based on the entity type of the raw entity 126, can recommend one or more relationships with respect to the raw entity 126, the one or more known entities 133 and/or one or more additional known entities by analyzing one or more knowledge graphs generated by the matching component 114. The one or more additional known entities can be those for which respective information was not employed by the determination component 110 and/or matching component 114. For example, one or more relationships can be determined from the generated knowledge graphs. The relationships can include indications that the raw entity 126 "is a", "can be installed on", "is similar to", "is written in", "runs on", "can be hosted on", "can be accessed from", "can commit changes via" and/or like relationship relative to the one or more other known entities 133 and/or additional known entities not selected as being most similar to the raw entity 126, and/or relative to one or more entity types identified or not identified for the raw entity 126. In one example, a natural language understanding (NL) algorithm can be employed by the application modernization system 102 for analyzing one or more extracted relevant and known surrounding contexts 132 and 134. In one example, a knowledge database can include a relationship table comprising relationships between entities for which data is comprised by the knowledge database.

Further, the relationship recommending component 118 can recommend one or more additional unknowns, such as one or more previously unknown entities, entity types and/or entity relationships, such as with respect to the knowledge graphs generated. For example, the relationship recommending component 118 can determine one or more entity relationships from data mined from one or more of the plurality of data locations, which entity relationships were not previously indicated, such as being comprised by one or more vectors, or comprised by one or more relationship tables, of the one or more knowledge databases 130 employed by the application modernization system 102.

Additionally, or alternatively, the application modernization system 102, such as via the updating component 140, can utilize active learning to update one or more knowledge databases 130 accessible to the application modernization system 102. Newly discovered entities, entity types and/or entity relationships can be added to the data comprised by the one or more knowledge databases 130. In this manner, further applications being modernized by the respective application modernization system 102 can be assessed according to continually optimized matching.

Figure 9:
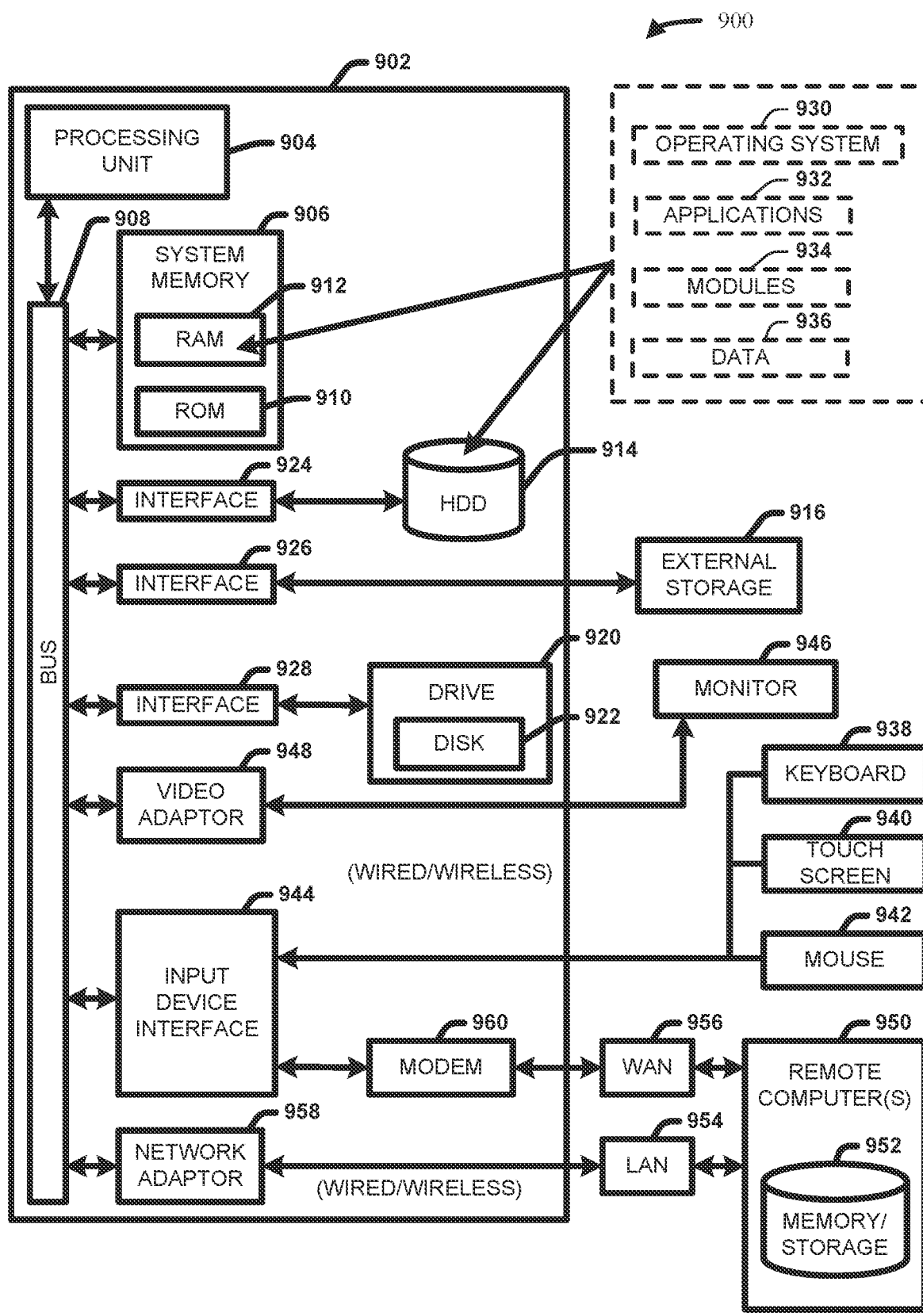
FIG. 9 illustrates a block diagram of an example, non-limiting operating environment in which one or more embodiments described herein can be facilitated.

In view of the above, a broader understanding of how the raw entity 126 functions in an operating environment, such as the operating environment 900 of FIG. 9, can be recommended. These one or more recommendations can enable the raw entity 126 to be standardized, and thus enable the parent application to be modernized, to thereby be employed relative to, i.e. by being standardized relative to, new or modern computer programming languages, software libraries, protocols, hardware platforms and/or the like.

Accordingly, in view of the aforementioned processes performed by the determination component 110, matching component 114, type identification component 116 and/or relationship recommending component 118, the raw entity 126 can be standardized. That is, data (e.g., entity name, entity type and/or entity relationships determined, identified and/or recommended by the application modernization system 102) can be provided to enable the use and/or functionality of the raw entity 126 relative to new and modern computer programming languages, software libraries, protocols, hardware platforms and/or the like For example, this data can be stored in the form of a JAVASCRIPT® object notation-based (JSON-based) inverted index relative to the standardized entity.

This data can be useful for one or more entities of an application to be modernized. Indeed, two or more entities can be standardized relative to one another, such that respective data is provided or related therewith, such as in the form of JSON-based inverted index, to enable the use and/or functionality of each of the two or more entities relative to one another and/or relative to common new and modern computer programming languages, software libraries, protocols, hardware platforms and/or the like. Further, this entity standardizing can enable the respective parent application to be modernized to also be used with the new and modern computer programming languages, software libraries, protocols, hardware platforms and/or the like. For example, the use can include generation of a container image for the modernized application that utilizes (e.g., comprises, employs and/or like function) the standardized entities (e.g., these standardized entities can comprise source code, libraries, dependencies, tools, applications and/or other files that are utilized to create the container). For this reason, in one example, the generation of a container image is unable to be completed absent identification of the entity type for the raw entity 126, and thus absent standardization of the raw entity 126.

With reference to the application modernization system 102, the container image generation component 120 can generate a container image file for the modernized application that can provide instructions to operate a containerized environment, or container, for the modernized application, which application utilizes the standardized raw entity 126. For example, the container image generation component 120 can compile executable code for the standardized raw entity 126 based on the data from the standardization of the raw entity 126, and for other standardized entities where applicable, into a container image, which executable code can be utilized to run the respective modernized application on a containerization platform, such as DOCKER®. In connection therewith, the container creation component 122 can create a virtualized run-time environment, or container, to execute the modernized parent application, such as isolated from a respective underlying system. For example, the container creation component 122 can execute the code comprised by the container image generated by the container image generation component 120. As a result, the modernized application can be executed relative to the new and modern computer programming languages, software libraries, protocols, hardware platforms and/or the like.

Further, it will be appreciated that the processes discussed above as being performed by one or more of the components of the application modernization system 102 can be performed by one or more alternative components in other embodiments. That is, the software and/or hardware comprised and/or utilized by any one or more component of the application modernization system 102 can instead be comprised and/or utilized by a different one or more components of a respective alternative embodiment of the application modernization system 102.

Figure 2:
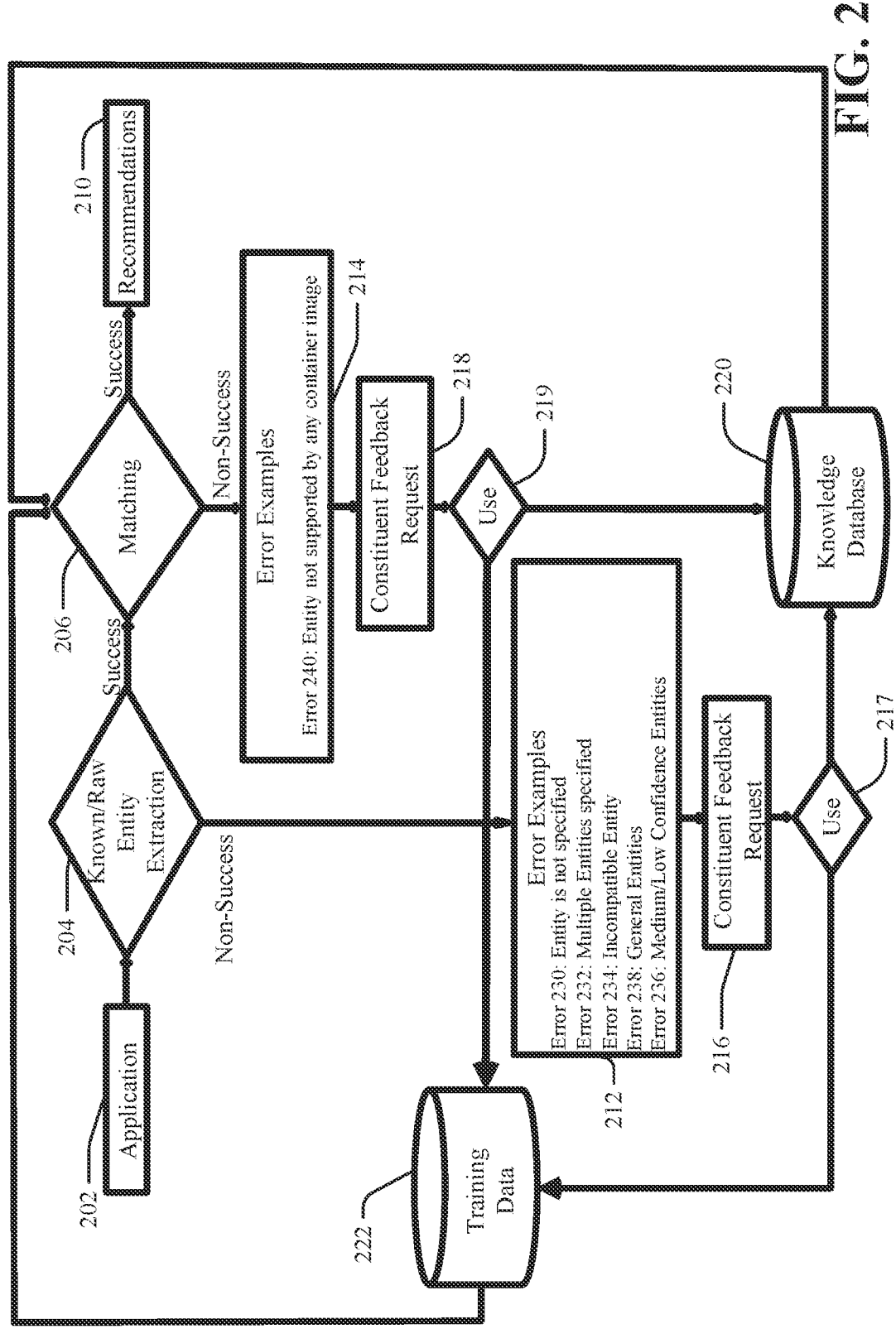
FIG. 2 illustrates a diagram of an example, non-limiting system that can facilitate entity standardization of one or more raw entities, in accordance with one or more embodiments described herein.

Turning next to FIG. 2, the figure illustrates a diagram of an example, non-limiting system 200 that can, in one or more instances, only reactively, as opposed to actively or proactively, facilitate entity standardization of one or more raw entities, in accordance with one or more embodiments described herein. Repetitive description of like elements and/or processes employed in respective embodiments is omitted for sake of brevity.

Unlike the application modernization system 102 of FIG. 1, the application modernization system 200 illustrated at FIG. 2 is not constructed to take an active and/or proactive approach to entity standardization. In the application modernization system 200, an application 202 to be modernized can be assessed to identify one or more raw and/or named entities of the application 202 (e.g., via a respective receiving or retrieving component, similar to the receiving or retrieving component 108 of FIG. 1). Extraction 204 of the entities can be attempted (e.g., via a respective extraction component, similar to the extraction component 112), although with varying levels of success, as will be explained.

That is, where all entities can be extracted at 204, the extracted entities can be matched at 206 (e.g., via a respective matching component, similar to the matching component 114) and labeled with known entity types (e.g., via a respective type identification component, similar to the type identification component 116). Entity relationships to one or more other entities and/or entity types can be provided at recommendations 210 (e.g., via a respective relationship recommending component, similar to the relationship recommending component 118) as outputs to the matching.

Alternatively, identifying all possible named raw entities can result in a failure or one or more errors 212. For example, in one instance, a raw entity cannot be matched to a known entity, such as where the raw entity is unstructured and thus does not have direct textual context to be mined, or such as where context is provided but a known entity is not discovered in a respective knowledge database 220 (e.g., Error 230). In other instances, more than one entity name can be returned from the extraction 204 for a single entity (e.g., Error 232), the entity type returned can be incompatible with the parent application to be modernized (e.g., Error 234), indications of medium or low confidence can be provided (e.g., Error 236), and/or only general entity names can be returned (e.g., Error 238).

Additionally, even where all entities are discovered and can be successfully extracted at 204, matching at 206 of the extracted entities to known entities can encounter one or more errors 214 similar to the one or more errors 212. For example, it can be determined that no successful match is found, such as where no supporting container image or known entity thereof is matched to each extracted entity (e.g., Error 240).

In the case of non-success at blocks representing errors 212 and/or errors 214, the application modernization system 200 can be directed to request constituent feedback 216 or 218, respectively, such as via a suitable constituent interface. The term constituent can refer to a machine, device, component, hardware, software or human Constituent feedback can include choosing between multiple returned entities, correcting entity naming, approving and/or denying the entity chosen. Via a respective decision block 217 or 219, the constituent feedback 216 and 218 can be utilized to update training data 222 (e.g., via a respective updating component, similar to the updating component 140) or to direct mining of a knowledge database 220, either of which training data 222 and knowledge database 220 can be used during the matching 206. Nonetheless, the constituent instead can be unable to provide the constituent feedback 216 and/or 218, and/or the constituent feedback 216 and/or 218 can utilize an undesirable number of hours to determine. Accordingly, the application modernization system 200 is thus reactive, as opposed to active and/or proactive, and in one or more instances, will be unable to proceed absent one or more iterations of constituent feedback 216 and/or 218, making the application modernization system 200 inefficient and constituent-dependent.

Figure 3:
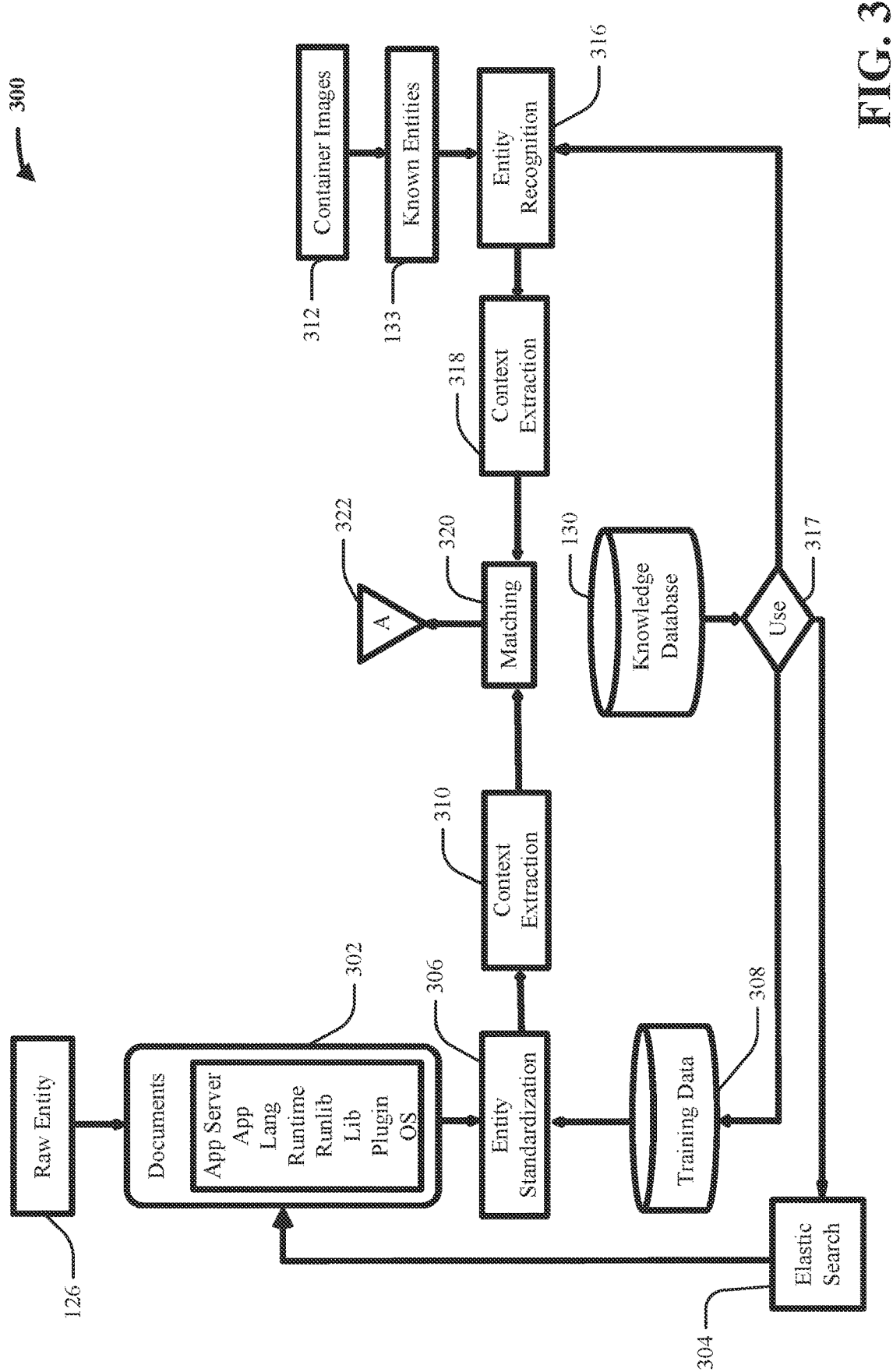
FIG. 3 illustrates a partial diagram of an example, non-limiting system that can facilitate the modernization of an application, including entity standardization of one or more raw entities, in accordance with one or more embodiments described herein.
Figure 4:
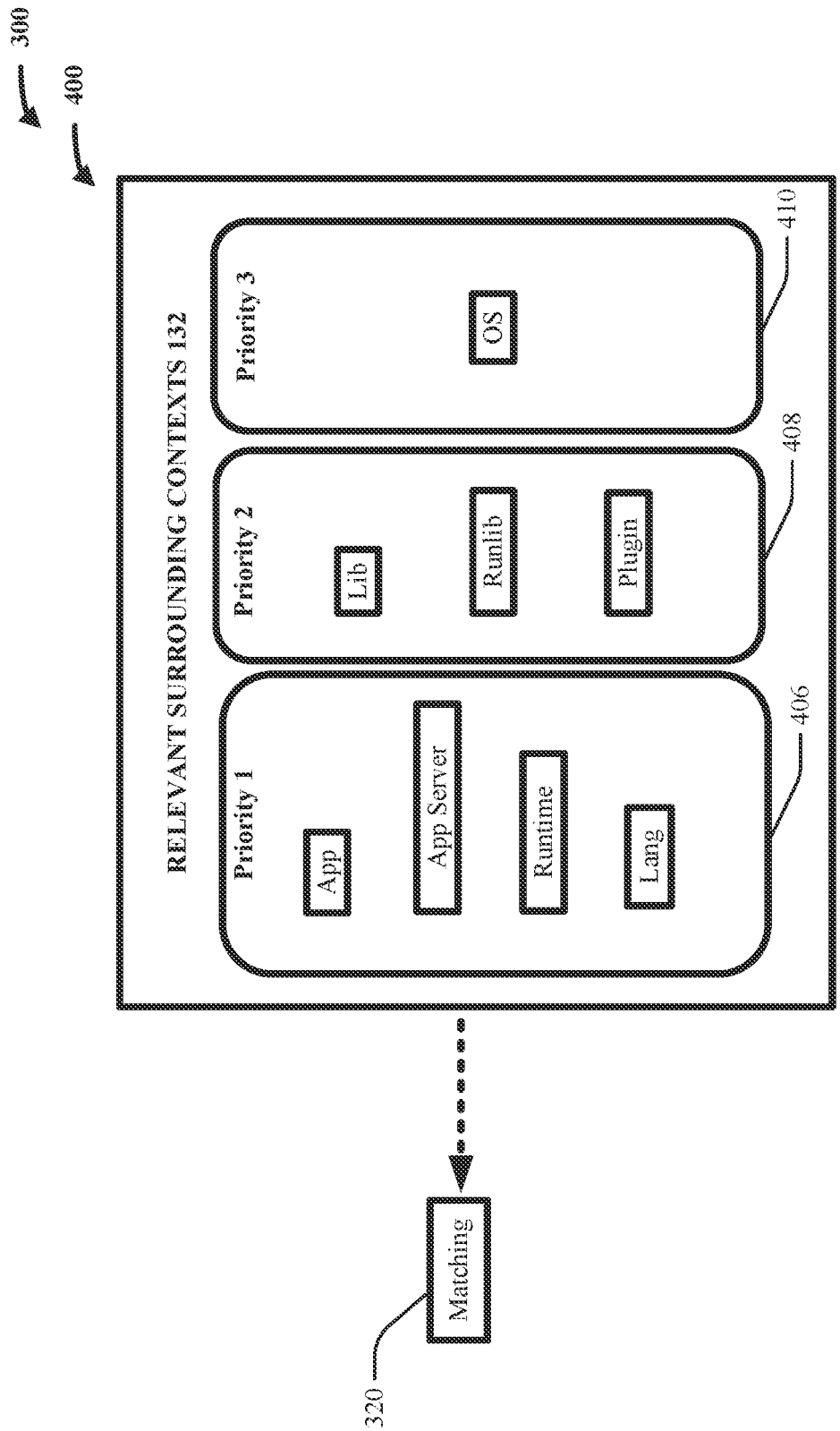
FIG. 4 illustrates a partial diagram of an example, non-limiting system that can facilitate the modernization of an application, including entity standardization of one or more raw entities of the application, in accordance with one or more embodiments described herein.
Figure 5:
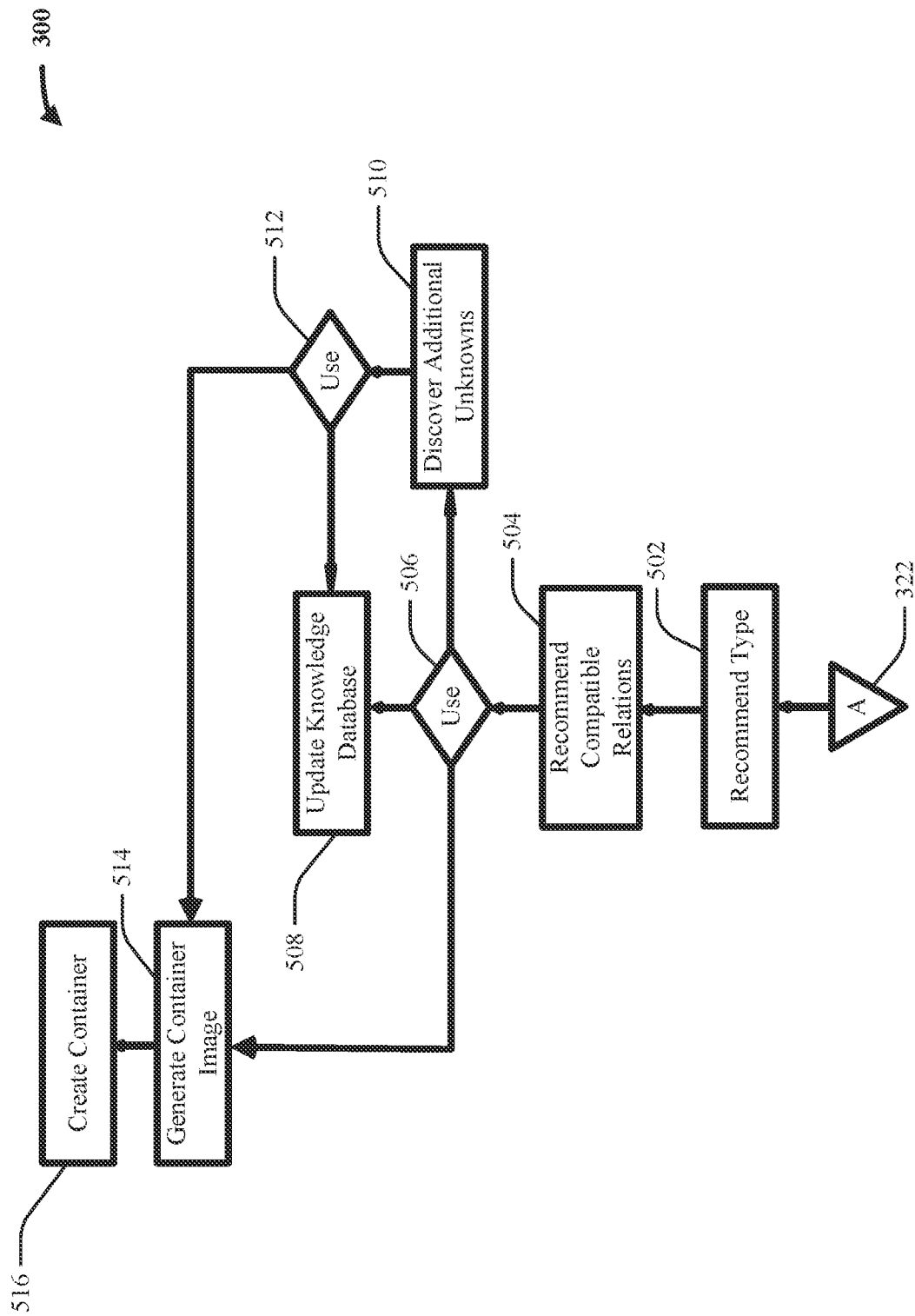
FIG. 5 illustrates a partial diagram, continuing the diagram of FIG. 3, and providing an example, non-limiting system that can facilitate the modernization of an application, including entity standardization of one or more raw entities, in accordance with one or more embodiments described herein.

FIG. 3 provides an alternative illustration of an embodiment of the application modernization system 102 of FIG. 1. The embodiment illustrated at FIG. 3 can address one or more of the problems associated with the embodiment of FIG. 2. FIG. 3 particularly illustrates a partial diagram of an example, non-limiting application modernization system 300 that can facilitate the modernization of an application, including entity standardization of one or more raw entities of the application, in accordance with one or more embodiments described herein. Additional portions of the diagram are illustrated at FIGS. 4 and 5. Repetitive description of like elements employed in other embodiments described herein is omitted for sake of brevity.

First, different from the application modernization system 200, an advantage of the application modernization system 300 is that it can be performed proactively and automatically, such as without human interaction with respect to any of entity standardization, entity recognition, and context matching. As described with reference to one or more components or aspects illustrated in FIG. 1, entity standardization 306 of a raw entity 126 can include discovery and assessment of one or more documents 302 related to the raw entity 126, such as by the determination component 110.

As illustrated, the processes of entity standardization 306 and entity recognition 316 can employ one or more knowledge databases 130 having textual data regarding known entities 133, entity types and/or entity relationships. That is, at decision block 317, the respective application modernization system 300 (e.g., via one or more components thereof), can be employed for one or more of use relative to training data 308 and entity standardization 306, entity recognition 316 and/or elastic search 304. The performance of the entity standardization 306 can be at least partially based on an elastic search 304 of the one or more knowledge databases 130 which can be performed by the determination component 110, and further can employ the determination algorithm 128 discussed with respect to FIG. 1. The elastic search 304 can include determining the one or more relevant surrounding contexts 132 of the raw entity 126 by searching a plurality of data locations. For example, a plurality of document 302 types, such as from the knowledge database 130, can be mined for data, including documents 302 related to the respective programming language, runtime, runlib, library, plugin(s), OS, application server and/or a parent application (e.g., via determination algorithm 128). As indicated above, entity standardization 306 can also employ training data 308 derived from the one or more knowledge databases 130, such as from performance of one or more iterations of application modernization by the application modernization system 300 and subsequent updating of the knowledge database by a respective updating component 140.

Extraction of the one or more relevant surrounding contexts 132 can be performed at the context extraction block 310, such as by the extraction component 112. Likewise, entity recognition 316 can be performed of known entities 133 from one or more container images 312, such as also by the determination component 110 with respect to a respective knowledge database 130. Extraction of the one or more known surrounding contexts 134 can be performed at the context extraction block 318, such as by the extraction component 112. Matching of the relevant and known surrounding contexts 132 and 134 provided from each of the context extraction blocks 310 and 318 can be performed at the matching block 320, such as by the matching component 114, e.g., via a similarity assessment as discussed above with reference to FIG. 1, and further described with respect to FIG. 4.

Turning briefly to FIG. 4, the figure illustrates a partial diagram of the example, non-limiting system 300 that can facilitate the modernization of an application, including entity standardization of one or more raw entities of the application, in accordance with one or more embodiments described herein. Repetitive description of like elements employed in other embodiments described herein is omitted for sake of brevity.

FIG. 4 illustrates a diagram of an example figurative illustration of a portion of the similarity assessment 400 utilized by the matching component 114 and illustrates a method of use of the documents 302 of FIG. 3 at the matching block 320. At the matching block 320, the matching component 114 can utilize a similarity assessment 400, which can be provided in the form of the priority algorithm 141. For example, via an iteration of the respective priority algorithm 141, priority can be given in the following example order: first from document types listed in the Priority 1 block 406, second from document types listed in the Priority 2 block 408, and third from document types listed in the Priority 3 block 410. That is, by way of the example of FIG. 4, priority can be given first to matching of relevant and known surrounding contexts 132 and 134 extracted from runtime, programming, application server and/or parent application documents (Priority 1 block 406). Priority can be given second to matching of relevant and known surrounding contexts 132 and 134 extracted from library, runlib and/or plugin documents (Priority 2 block 408). Priority can be given third to matching of relevant and known surrounding contexts 132 and 134 extracted from OS documents (Priority 3 block 410). The OS documents can be of a higher level of description and instruction relative to the document types of Priority 1 and 2 blocks 406 and 408, respectively. In other embodiments, different document types, different prioritized order of the priority blocks and/or different prioritized order of document types, irrespective of their illustrated parent priority block, can be employed.

Additionally, as discussed above with reference to FIG. 1, the matching block 320, such as via the matching component 114, further can comprise setting of one or more thresholds and/or gates than can be selectively augmented, such as by a constituent. In various examples, the thresholds and/or gates can be different with respect to each of the different Priority 1, 2 and 3 blocks 406, 408 and 410.

Turning next to FIG. 5, the figure illustrates another partial diagram of the example, non-limiting application modernization system 300 that can facilitate the modernization of an application, including entity standardization of one or more raw entities of the application, in accordance with one or more embodiments described herein. Repetitive description of like elements employed in other embodiments described herein is omitted for sake of brevity.

In the partial application modernization system 300 illustrated in FIG. 5, the illustrated application modernization system 300 of FIG. 3 is continued, represented by the continuation triangle "A" 322 illustrated at each of FIGS. 3 and 5. The matching block 320 and matching component 114 can generate an output, such as a chosen known entity 133, having a knowledge graph having a greatest similarity to a knowledge graph of the respective raw entity 126, for example in accordance with the similarity assessment 400. The application modernization system 300 can recommend an entity type (such as app, language, OS and/or the like), such as via the type identification component 116 at the recommend type block 502. This type can be used during mapping of the raw entity 126 at recommend type block 502, such as via the relationship recommending component 118. Based on the similarity assessment employed by the application modernization system 300, such as utilizing the knowledge graphs generated by the application modernization system 300, the application modernization system 300 also can recommend one or more compatible relations at the recommend compatible relations block 504, via the relationship recommending component 118. These relationships recommended can be relative to the raw entity 126, one or more known entities 133 and/or entity types.

At block 506, the application modernization system 300 can discover one or more additional unknowns, such as one or more previously unknown entities, entity types and/or entity relationships, such as from the knowledge graphs generated. Based on the results of the matching 320, type recommendation 502 and/or relationship recommendation 504, the application modernization system 300 can generate a container image at 514, such as via the container image generation component 120. The application modernization system 300 further can create an application container at 516, such as via the container creation component 122, such as for running the modernized parent application with respect to a standardized raw entity 126. It will be appreciated that although the recommend type block 502, recommend compatible relations block 504, discover additional unknowns block 506 and generate container image block 514 are illustrated as being connected in a linear or singular order, this illustration is not intended to be limiting. Where suitable, respective processes of these blocks can occur at least partially simultaneously or concurrently with one another.

Figure 6:
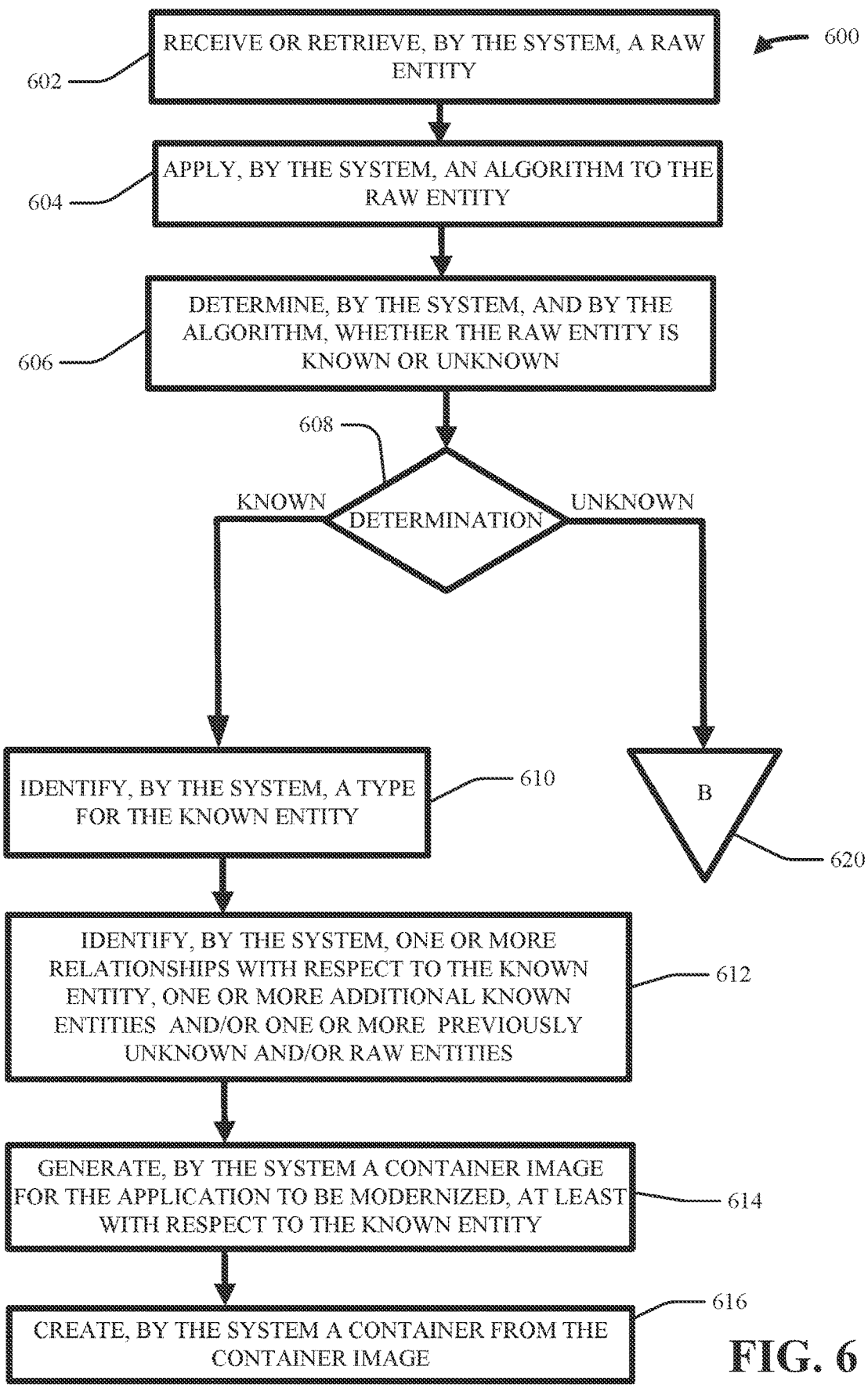
FIG. 6 illustrates a flow diagram of an example, non-limiting computer-implemented method that can facilitate the modernization of an application, including entity standardization of one or more raw entities, in accordance with one or more embodiments described herein.
Figure 7:
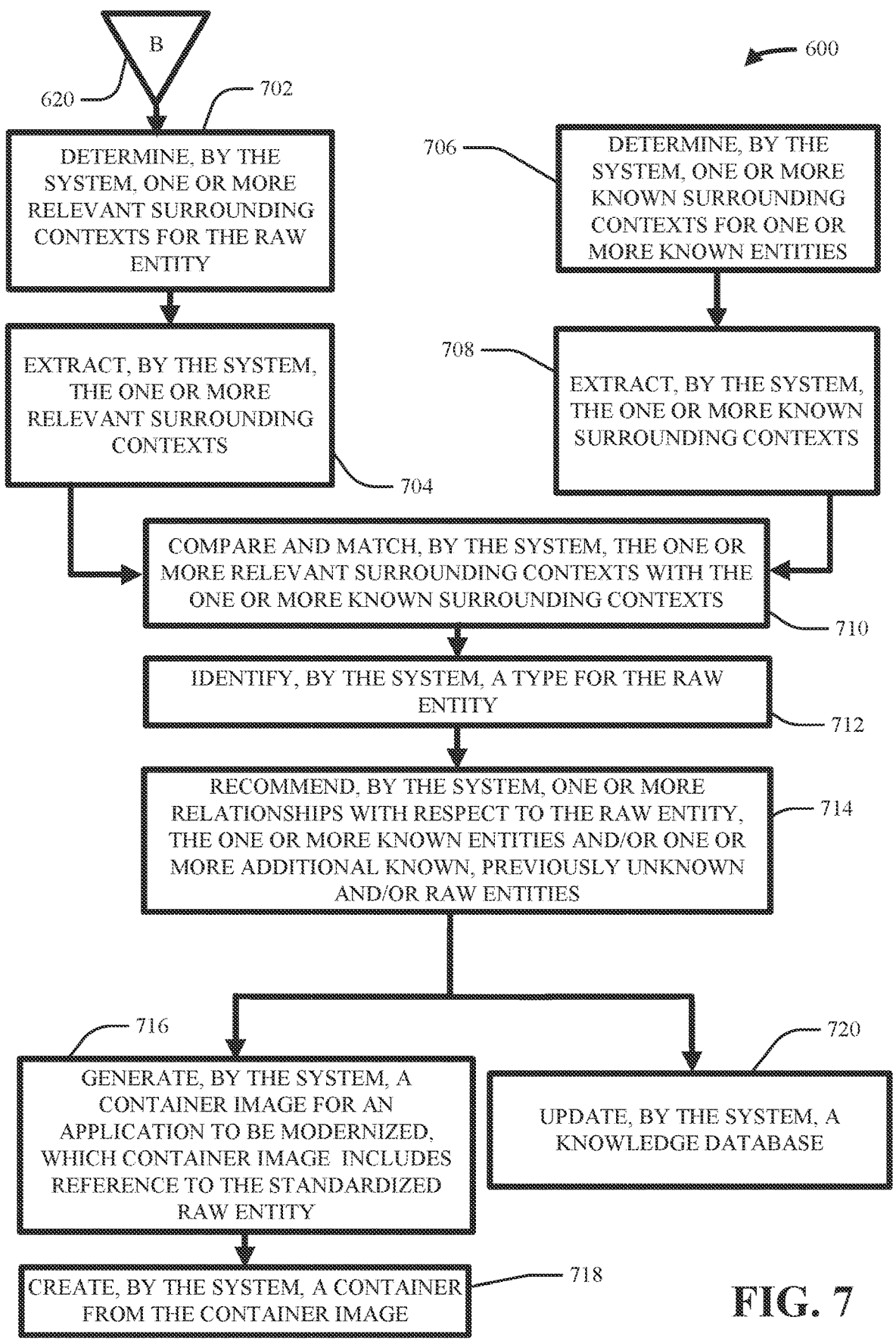
FIG. 7 illustrates a continuation of the flow diagram of FIG. 6, providing an example, non-limiting computer-implemented method that can facilitate the modernization of an application, including entity standardization of one or more raw entities, in accordance with one or more embodiments described herein.
Figure 8:
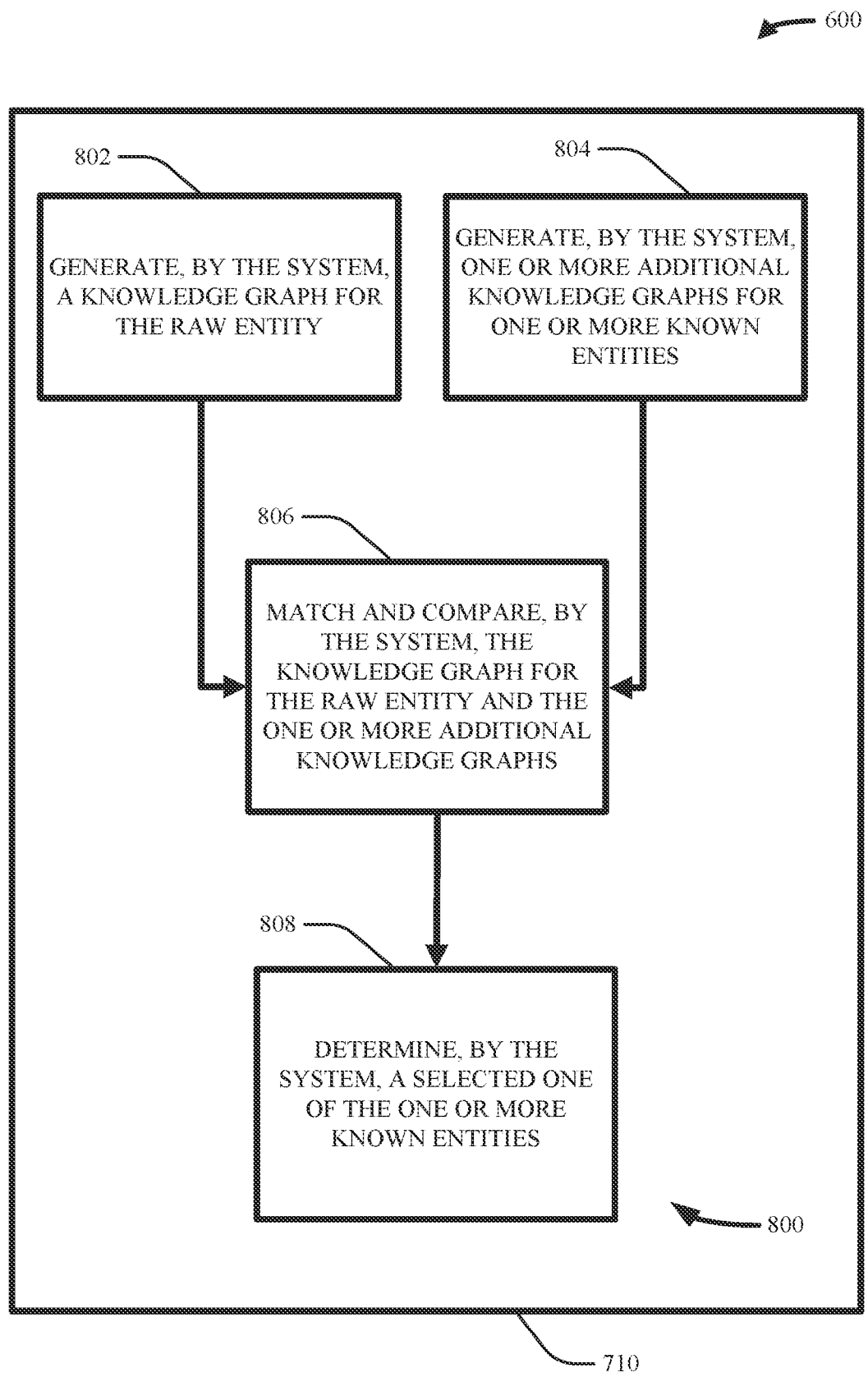
FIG. 8 illustrates another continuation of the flow diagram of FIG. 6, providing an example, non-limiting computer-implemented method that can facilitate the modernization of an application, including entity standardization of one or more raw entities, in accordance with one or more embodiments described herein.

Referring next to FIGS. 6 to 8, these figures together illustrate a flow diagram of an example, non-limiting computer-implemented method 600 that can facilitate the modernization of an existing application, including entity standardization of one or more raw entities of the application, in accordance with one or more embodiments described herein. Repetitive description of like elements and/or processes employed in respective embodiments is omitted for sake of brevity.

Looking first to 602 at FIG. 6, the computer-implemented method 600 can comprise receiving, by a system (e.g., via application modernization system 102 and/or receiving and retrieving component 108) operatively coupled to a processor (e.g., processor 106, a quantum processor and/or the like and/or the like), a raw entity (e.g. raw entity 126 or another entity from an existing application to be modernized).

At 604, the computer-implemented method 600 can comprise applying, by the system (e.g., via application modernization system 102 and/or determination component 110), an algorithm (e.g., determination algorithm 128) to the raw entity. At 606, the computer-implemented method 600 can comprise determining, by a system (e.g., via application modernization system 102 and/or determination component 110) and by the algorithm (e.g., determination algorithm 128), whether the raw entity is known or unknown (e.g., at decision block 608), such as relative to one or more knowledge databases (e.g., knowledge database 130) accessible by the system.

Where the raw entity (e.g. raw entity 126 or another entity from an existing application to be modernized) is determined as a known entity (e.g., a known entity 133) at 610, the computer-implemented method 600 can comprise identifying, by the system (e.g., via application modernization system 102 and/or type identification component 116), an entity type for the known entity, being the entity type mined from the one or more respective knowledge data bases (e.g., knowledge database 130).

At 612, the computer-implemented method 600 can comprise identifying, by the system (e.g., via application modernization system 102 and/or relationship recommending component 118), one or more relationships with respect to the known entity, one or more additional known entities (e.g., known entities 133 from a knowledge database 130) and/or one or more previously unknown or raw entities.

At 614, the computer-implemented method 600 can comprise generating, by the system (e.g., via application modernization system 102 and/or container image generation component 120), a container image for the application to be modernized, at least with respect to the known entity. In an example, the system 600 also can generate the container image with respect to any number of additional entities discovered from the application to be modernized and having been standardized.

At 616, the computer-implemented method 600 can comprise creating, by the system (e.g., via application modernization system 102 and/or container creation component 122), a container from the container image for running the modernized application.

Next, FIG. 7 illustrates an alternative continuation of the method 600 partially illustrated at the flow diagram of FIG. 6. At FIG. 7, the method 600 of FIG. 6 is continued, represented by the continuation triangle "B" 620 illustrated at each of FIGS. 6 and 7. Repetitive description of like elements and/or processes employed in respective embodiments is omitted for sake of brevity.

Looking first to block 702, where the determination at the decision block 608 alternatively is "unknown", the computer-implemented method 600 can comprise determining, by the system (e.g., via application modernization system 102 and/or determination component 110), one or more surrounding contexts (e.g., relevant surrounding contexts 132) that are relevant to the raw entity (e.g. raw entity 126 or another entity from an existing application to be modernized). In an example, these surrounding contexts can be determined by the system directly from the raw entity. In another example, these surrounding contexts can be determined by the system from one or more knowledge databases (e.g., knowledge databases 130) accessible by the system.

At 704, the computer-implemented method 600 can comprise extracting, by the system (e.g., via application modernization system 102 and/or extraction component 112), the one or more surrounding contexts (e.g., relevant surrounding contexts 132).

Concurrently and/or subsequently, at 706, the computer-implemented method 600 can comprise determining, by the system (e.g., via application modernization system 102 and/or determination component 110), one or more surrounding contexts (e.g., known surrounding contexts 134) that are relevant to one or more known entities (e.g. known entities 133). In one example, the system can employ the one or more knowledge databases (e.g., knowledge databases 130) to determine these surrounding contexts.

At 708, the computer-implemented method 600 can comprise extracting, by the system (e.g., via application modernization system 102 and/or extraction component 112), the one or more surrounding contexts (e.g., known surrounding contexts 134).

At 710, the computer-implemented method 600 can comprise matching, by the system (e.g., via application modernization system 102 and/or matching component 114), the one or more relevant surrounding contexts (e.g., relevant surrounding contexts 132) with the one or more known surrounding contexts (e.g., known surrounding contexts 134). In one example, the system can perform a matching assessment using a similarity assessment, such as illustrated at FIG. 8, to be discussed.

At 712, the computer-implemented method 600 can comprise identifying, by the system (e.g., via application modernization system 102 and/or type identification component 116), an entity type of the raw entity as an entity type of the selected one of the one or more known entities.

At 714, the computer-implemented method 600 can comprise recommending, by the system (e.g., via application modernization system 102 and/or relationship recommending component 118), one or more relationships with respect to the raw entity, the one or more known entities and/or one or more additional known, previously unknown and/or raw entities. In one example, this identification can be based on the similarity assessment employed by the system and/or by the knowledge graphs generated by the system. In one example, the system can recommend one or more compatible relationships between the raw entity and one or more known entities and/or entity types and/or can discover one or more additional unknowns, such as one or more previously unknown entities, entity types and/or entity relationships.

At 716, the computer-implemented method 600 can comprise generating, by the system (e.g., via application modernization system 102 and/or container image generation component 120), a container image for the application to be modernized, at least with respect to the standardized raw entity. In an example, the system 600 also can generate the container image with respect to any number of additional standardized entities from the application to be modernized.

At 718, the computer-implemented method 600 can comprise creating, by the system (e.g., via application modernization system 102 and/or container creation component 122), a container from the container image, for running the modernized application.

At 720, the computer-implemented method 600 can comprise updating, by the system (e.g., via application modernization system 102 and/or updating component 140), a knowledge database (e.g., a knowledge database 130) with information relative to the raw entity and/or relative to the recommendations provided by the system (e.g., via application modernization system 102 and/or relationship recommending component 118).

Next, FIG. 8 illustrates an exemplary sub-method 800 performed at block 710 of FIG. 7 to compare and match, by the system, the one or more relevant surrounding contexts with the one or more known surrounding contexts. Repetitive description of like elements and/or processes employed in respective embodiments is omitted for sake of brevity.

At 802, the computer-implemented method 800 can comprise generating, by the system (e.g., via application modernization system 102 and/or matching component 114) a knowledge graph for the raw entity (e.g., raw entity 126).

At 804, the computer-implemented method 800 can comprise generating, by the system (e.g., via application modernization system 102 and/or matching component 114) one or more additional knowledge graphs for one or more known entities (e.g., known entities 133).

At 806, the computer-implemented method 800 can comprise matching and/or comparing, by the system (e.g., via application modernization system 102 and/or matching component 114) the knowledge graph for the raw entity and the one or more additional knowledge graphs, such as employing a respective algorithm (e.g., priority algorithm 141) thereby using knowledge graph embedding techniques based on the one or more surrounding contexts (e.g., relevant surrounding contexts 132 and known surrounding contexts 134).

At 808, the computer-implemented method 800 can comprise determining, by the system (e.g., via application modernization system 102 and/or matching component 114) one or more known entities (e.g., known entities 133) having similar knowledge graphs to a generated knowledge graph of the raw entity. The system (e.g., via application modernization system 102 and/or matching component 114) can further determine a selected one of the one or more known entities that is most similar to the raw entity. In one example, the system can determine a selected one of the one or more known entities having a knowledge graph most similar to a knowledge graph of the raw entity. For example, as described above with reference to FIGS. 1 and 4, the system (e.g., via application modernization system 102 and/or matching component 114) can utilize a similarity assessment (e.g., similarity assessment 400), which can include employing a priority algorithm (e.g., the priority algorithm 141).

In the above examples, it should be appreciated that application modernization system 102 can thereby eliminate the human effort and reduce the time involved with standardizing one or more raw entities. In another example, application modernization system 102 can automatically provide this standardization even in instances where the raw entity is unstructured and thus does not have direct textual context for mining, or where context is provided but a known entity is not discovered in a respective knowledge database being mined. In the examples above, it should be appreciated that application modernization system 102 can therefore enable scaling of standardization of numerous raw entities and thus modernization of numerous applications. For example, in the software technical support domain, application modernization system 102 can enable scaling technician skills, as technicians in this domain can employ application modernization system 102 to modernize libraries of existing applications relative to new and modern computer programming languages, software libraries, protocols, hardware platforms and/or the like.

Application modernization system 102 can provide technical improvements to a processing unit associated with application modernization system 102. For example, in generating the above described knowledge graphs and standardizing the aforementioned raw entity, application modernization system 102 can enable use of the raw entity, and its parent application, with new and modern computer programming languages, software libraries, protocols, hardware platforms and/or the like. For example, a container image can be generated with respect to the parent application to be modernized, for use with the new and modern computer programming languages, software libraries, protocols, hardware platforms and/or the like. Absent the entity standardization provided by the application modernization system 102, a raw entity is unable to be standardized or requires one or more iterations of constituent feedback. Accordingly, by this example, the application modernization system 102 can thereby facilitate improved performance, improved efficiency and/or reduced computational cost associated with a processing unit (e.g., processor 106) employing the modernized application and/or standardized entity.

A practical application of application modernization system 102 is that it can be implemented in one or more domains to enable scaled modernization of one or more applications used, or to be used, in such domain(s). For example, a practical application of application modernization system 102 is that it can be implemented in the software technical support domain to enable scaling of technician skills. For instance, technicians in the software technical support domain can employ application modernization system 102 to simultaneously modernize libraries of existing applications relative to new and modern computer programming languages, software libraries, protocols, hardware platforms and/or the like.

It should be appreciated that application modernization system 102 provides a new approach driven by previously unincorporated similarity assessments. For example, application modernization system 102 can provide a new approach to automatically standardize a raw entity relative to new and modern computer programming languages, software libraries, protocols, hardware platforms and/or the like, without constituent feedback. In another example, application modernization system 102 can provide this standardization even in instances where the raw entity is unstructured and thus does not have direct textual context for mining, or where context is provided but a known entity is not discovered in a respective knowledge database being mined. In another example, application modernization system 102 can provide selective control of accuracy of the application modernization system 102 to return contexts, and thus subsequently determine an entity type for the raw entity, from one or more of the plurality of data locations selected as having, for example, higher quality information, while selectively reducing use of information from other data locations of the plurality of data locations.

Application modernization system 102 can employ hardware or software to solve problems that are highly technical in nature (e.g., related to automated detection of entity type and relationships to one or more other entities), that are not abstract, and that cannot be performed as a set of mental acts by a human. For example, a human, or even thousands of humans, cannot efficiently, accurately and effectively manually modernize existing applications relative to continually updated and/or newly written programming languages, software libraries, protocols, hardware platforms and/or the like. Nor can a human, or even thousands of humans, efficiently, accurately and effectively manually locate, review and analyze the voluminous amounts of new content continually added to public and non-public knowledge databases of known container images, applications and/or entities to identify entity type and/or entity relationship data of entities of the applications to be modernized.

In some embodiments, one or more of the processes described herein can be performed by one or more specialized computers (e.g., a specialized processing unit, a specialized classical computer, a specialized quantum computer and/or another type of specialized computer) to execute defined tasks related to the various technologies identified above. Application modernization system 102 and/or components thereof, can be employed to solve new problems that arise through advancements in technologies mentioned above, employment of quantum computing systems, cloud computing systems, computer architecture and/or another technology.

It is to be appreciated that application modernization system 102 can utilize various combinations of electrical components, mechanical components and/or circuitry that cannot be replicated in the mind of a human and/or performed by a human, as the various operations that can be executed by application modernization system 102 and/or components thereof as described herein are operations that are greater than the capability of a human mind. For instance, the amount of data processed, the speed of processing such data and/or the types of data processed by application modernization system 102 over a certain period of time can be greater, faster and/or different than the amount, speed and/or data type that can be processed by a human mind over the same period of time.

According to several embodiments, application modernization system 102 can also be fully operational towards performing one or more other functions (e.g., fully powered on, fully executed and/or another function) while also performing the various operations described herein. It should be appreciated that such simultaneous multi-operational execution is beyond the capability of a human mind. It should also be appreciated that application modernization system 102 can include information that is impossible to obtain manually by an entity, such as a human user. For example, the type, amount and/or variety of information included in and/or employed by application modernization system 102, determination component 110, matching component 114, type identification component 116, relationship recommending component 118 and/or updating component 140 can be more complex than information obtained manually by an entity, such as a human user.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

In order to provide additional context for various embodiments described herein, FIG. 9 and the following discussion are intended to provide a brief, general description of a suitable operating environment 900 in which the various embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures and/or the like, that perform particular tasks and/or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) and/or other optical disk storage, magnetic cassettes, magnetic tape, magnetic disk storage and/or other magnetic storage devices, solid state drives or other solid state storage devices and/or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory and/or computer-readable media that are not only propagating transitory signals per se.

Computer-readable storage media can be accessed by one or more local or remote computing devices, e.g., via access requests, queries and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, but not limitation, communication media can include wired media, such as a wired network and/or direct-wired connection, and/or wireless media, such as acoustic, RF, infrared and/or other wireless media.

With reference again to FIG. 9, the example operating environment 900 for implementing various embodiments of the aspects described herein includes a computer 902, the computer 902 including a processing unit 904, a system memory 906 and/or a system bus 908. The system bus 908 can couple system components including, but not limited to, the system memory 906 to the processing unit 904. The processing unit 904 can be any of various commercially available processors. Dual microprocessors and/or other multi-processor architectures can be employed as the processing unit 904.

The system bus 908 can be any of several types of bus structure that can further interconnect to a memory bus (with or without a memory controller), a peripheral bus and/or a local bus using any of a variety of commercially available bus architectures. The system memory 906 can include ROM 910 and/or RAM 912. A basic input/output system (BIOS) can be stored in a non-volatile memory such as ROM, erasable programmable read only memory (EPROM) and/or EEPROM, which BIOS contains the basic routines that help to transfer information between elements within the computer 902, such as during startup. The RAM 912 can also include a high-speed RAM, such as static RAM for caching data.

The computer 902 further can include an internal hard disk drive (HDD) 914 (e.g., EIDE, SATA), one or more external storage devices 916 (e.g., a magnetic floppy disk drive (FDD), a memory stick or flash drive reader, a memory card reader and/or the like) and/or a drive 920, e.g., such as a solid state drive or an optical disk drive, which can read or write from a disk 922, such as a CD-ROM disc, a DVD, a BD and/or the like. Alternatively, where a solid state drive is involved, disk 922 could not be included, unless separate. While the internal HDD 914 is illustrated as located within the computer 902, the internal HDD 914 can also be configured for external use in a suitable chassis (not shown). Additionally, while not shown in operating environment 900, a solid state drive (SSD) could be used in addition to, or in place of, an HDD 914. The HDD 914, external storage device(s) 916 and drive 920 can be connected to the system bus 908 by an HDD interface 924, an external storage interface 926 and a drive interface 928, respectively. The HDD interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more applications 932, other program modules 934 and/or program data 936. All or portions of the operating system, applications, modules and/or data can also be cached in the RAM 912. The systems and methods described herein can be implemented utilizing various commercially available operating systems and/or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In a related embodiment, operating system 930 can comprise one virtual machine (VM) of multiple VMs hosted at computer 902. Furthermore, operating system 930 can provide runtime environments, such as the JAVA runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and/or settings for an application.

Further, computer 902 can be enabled with a security module, such as a trusted processing module (TPM). For instance, with a TPM, boot components hash next in time boot components and wait for a match of results to secured values before loading a next boot component. This process can take place at any layer in the code execution stack of computer 902, e.g., applied at application execution level and/or at operating system (OS) kernel level, thereby enabling security at any level of code execution.

A user, or constituent, can enter commands and information into the computer 902 through one or more wired/wireless input devices, e.g., a keyboard 938, a touch screen 940 and/or a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices can be connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface and/or the like.

A monitor 946 or other type of display device can be also connected to the system bus 908 via an interface, such as a video adapter 948. In addition to the monitor 946, a computer typically includes other peripheral output devices (not shown), such as speakers, printers and/or the like.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device and/or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 and/or can be connected to a communications server on the WAN 956 via other means for establishing communications over the WAN 956, such as by way of the Internet. The modem 960, which can be internal or external and a wired and/or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above, such as but not limited to, a network virtual machine providing one or more aspects of storage or processing of information. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf and/or the like) and/or telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
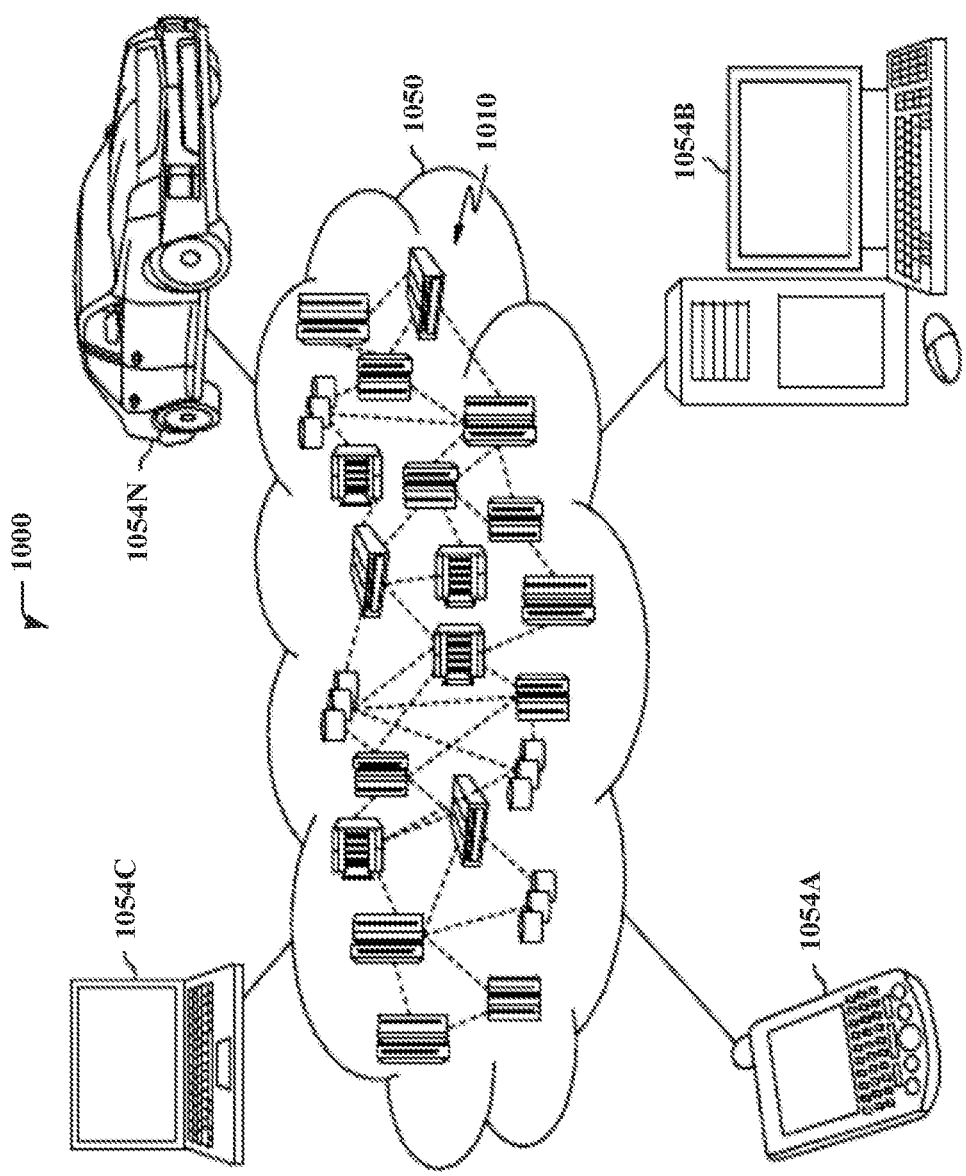
FIG. 10 illustrates a block diagram of an example, non-limiting cloud computing environment in accordance with one or more embodiments described herein.

Referring now to FIG. 10, an illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C and/or automobile computer system 1054N may communicate. Although not illustrated in FIG. 10, cloud computing nodes 1010 can further comprise a quantum platform (e.g., quantum computer, quantum hardware, quantum software and/or the like) with which local computing devices used by cloud consumers can communicate. Cloud computing nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that cloud computing nodes 1010 and cloud computing environment 1050 can communicate with any type of computerized device over any type of network and/or network addressable connection (e.g., using a web browser).

Figure 11:
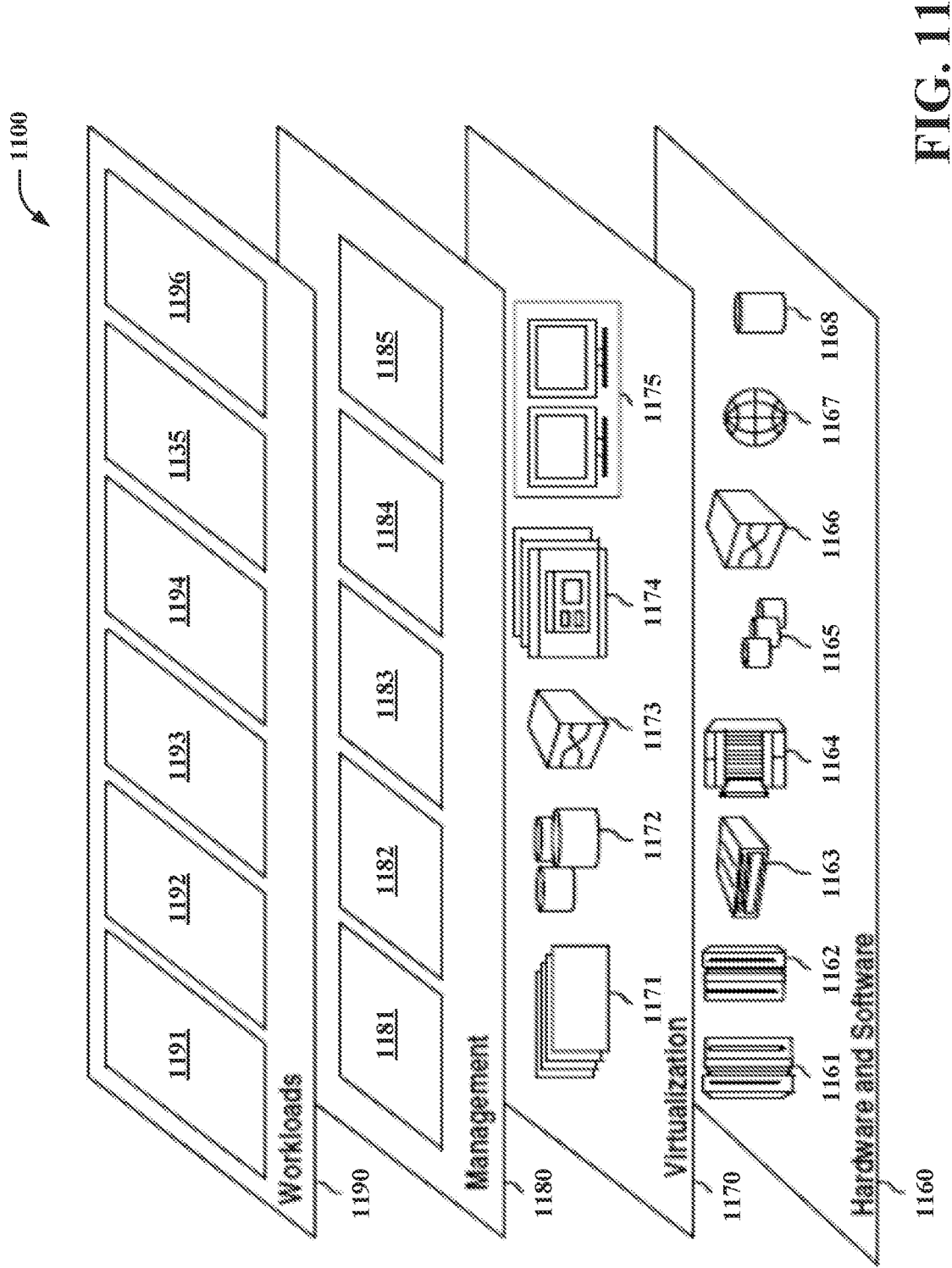
FIG. 11 illustrates a block diagram of a plurality of example, non-limiting abstraction model layers, in accordance with one or more embodiments described herein.

Referring now to FIG. 11, a set of functional abstraction layers is shown, such as provided by cloud computing environment 1050 (FIG. 10). It should be understood in advance that the components, layers and functions shown in FIG. 11 are intended to be illustrative only and embodiments described herein are not limited thereto. As depicted, the following layers and corresponding functions are provided:

Hardware and software layer 1160 can include hardware and software components. Examples of hardware components include: mainframes 1161; RISC (Reduced Instruction Set Computer) architecture-based servers 1162; servers 1163; blade servers 1164; storage devices 1165; and networks and networking components 1166. In some embodiments, software components can include network application server software 1167, quantum platform routing software 1168 and/or quantum software (not illustrated in FIG. 11).

Virtualization layer 1170 can provide an abstraction layer from which the following examples of virtual entities may be provided: virtual servers 1171; virtual storage 1172; virtual networks 1173, including virtual private networks; virtual applications and/or operating systems 1174; and/or virtual clients 1175.

In one example, management layer 1180 may provide the functions described below. Resource provisioning 1181 can provide dynamic procurement of computing resources and other resources that can be utilized to perform tasks within the cloud computing environment. Metering and Pricing 1182 can provide cost tracking as resources are utilized within the cloud computing environment, and billing or invoicing for consumption of these resources. In one example, these resources can include application software licenses. Security can provide identity verification for cloud consumers and tasks, as well as protection for data and other resources. User (or constituent) portal 1183 can provide access to the cloud computing environment for consumers and system administrators. Service level management 1184 can provide cloud computing resource allocation and management such that required service levels are met. Service Level Agreement (SLA) planning and fulfillment 1185 can provide pre-arrangement for, and procurement of, cloud computing resources for which a future requirement is anticipated in accordance with an SLA.

Workloads layer 1190 can provide examples of functionality for which the cloud computing environment may be utilized. Non-limiting examples of workloads and functions which can be provided from this layer include: mapping and navigation 1191; software development and lifecycle management 1192; virtual classroom education delivery 1193; data analytics processing 1194; transaction processing 1195; and/or application transformation software 1196.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry or either source code or object code written in any combination of one or more programming languages, including an object oriented programming language such as Smalltalk, C++ a like language, and/or one or more procedural programming languages, such as the "C" programming language and/or similar programming languages. The computer readable program instructions can execute entirely on the user's computer, partly on the user's computer, as a stand-alone software package, partly on the user's computer and/or partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described herein with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality, and operation of possible implementations of systems, computer-implementable methods and/or computer program products according to various embodiments described herein. In this regard, each block in the flowchart or block diagrams can represent a module, segment and/or portion of instructions, which comprises one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that the one or more embodiments herein also can be implemented in combination with other program modules. Generally, program modules include routines, programs, components, data structures and/or the like that perform particular tasks and/or implement particular abstract data types. Moreover, those skilled in the art will appreciate that the inventive computer-implemented methods can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics and/or the like. The illustrated aspects can also be practiced in distributed computing environments in which tasks are performed by remote processing devices that are linked through a communications network. However, some, if not all aspects of the one or more embodiments can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. Herein, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing the one or more embodiments, but one of ordinary skill in the art can recognize that many further combinations and permutations of the one or more embodiments are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
 a memory that stores computer executable components; and
 a processor that executes the computer executable components stored in the memory, wherein the computer executable components comprise:
  a determination component that determines, from a plurality of data locations, a first group of surrounding contexts for a raw entity of a software application to be modernized;
  a matching component that:
   matches the first group of surrounding contexts with one or more respective second groups of known surrounding contexts of one or more known entities according to a defined threshold, and
   determines a selected one of the one or more known entities by prioritizing the first group of surrounding contexts based on a defined order of priority for respective data locations from which the first group of surrounding contexts were determined; and
  a type identification component that identifies an entity type for the raw entity based on the selected known entity.

2. The system of claim 1, wherein the determination component applies a determination algorithm to the raw entity to determine whether the raw entity is known or unknown relative to a knowledge base accessible by the system.

3. The system of claim 1, wherein the matching component
 generates a knowledge graph for the raw entity based on the first group of surrounding contexts,
 generates one or more additional knowledge graphs for the one or more known entities based on the one or more respective second groups of known surrounding contexts, and
 compares the knowledge graph for the raw entity to the one or more additional knowledge graphs.

4. The system of claim 3, wherein the matching component further determines the selected known entity as having a respective additional knowledge graph that has more data in common with the knowledge graph of the raw entity than others of the one or more additional knowledge graphs.

5. The system of claim 1, wherein the computer executable components further comprise:
 a relationship recommending component that recommends one or more relationships with respect to the raw entity, the one or more known entities, or one or more additional known or previously unknown entities by analyzing one or more knowledge graphs generated by the matching component.

6. The system of claim 1, wherein the computer executable components further comprise:
 a container image generation component that generates a container image for a new software application, wherein the generation of the container image is unable to be completed absent identification of the entity type for the raw entity.

7. The system of claim 1, wherein the knowledge graph has respective nodes for the raw entity and the first group of surrounding contexts, and wherein the one or more additional knowledge graphs respectively have nodes for the associated one or more known entities and the associated one or more respective second groups of known surrounding contexts.

8. A computer-implemented method, comprising:
 determining, by a system operatively coupled to a processor, from a plurality of data locations, a first group of surrounding contexts for a raw entity of a software application to be modernized;
 matching, by the system, the first group of surrounding contexts with one or more respective second groups of known surrounding contexts of one or more known entities according to a defined threshold;
 determining, by the system, a selected one of the one or more known entities by prioritizing the first group of surrounding contexts based on a defined order of priority for respective data locations from which the first group of surrounding contexts were determined; and
 identifying, by the system, an entity type for the raw entity based on the selected known entity.

9. The computer-implemented method of claim 8, further comprising:
 applying, by the system, a determination algorithm to the raw entity to determine whether the raw entity is known or unknown relative to a knowledge base accessible by the system.

10. The computer-implemented method of claim 8, wherein the matching, by the system, further comprises:
 generating, by the system, a knowledge graph for the raw entity based on the first group of surrounding contexts,
 generating, by the system, one or more additional knowledge graphs for the one or more known entities based on the one or more respective second groups of known surrounding contexts, and
 comparing, by the system, the knowledge graph for the raw entity to the one or more additional knowledge graphs.

11. The computer-implemented method of claim 10, wherein the matching, by the system further comprises:
 determining, by the system, the selected known entity as having a respective additional knowledge graph that has more data in common with the knowledge graph of the raw entity than others of the one or more additional knowledge graphs.

12. The computer-implemented method of claim 8, further comprising:
 recommending, by the system, one or more relationships with respect to the raw entity, the one or more known entities, or one or more additional known or previously unknown entities by analyzing, by the system, one or more knowledge graphs generated by the system.

13. The computer-implemented method of claim 8, further comprising:
 generating, by the system, a container image for a new software application, wherein the generating, by the system, of the container image is unable to be completed absent identifying, by the system, the entity type for the raw entity.

14. The computer-implemented method of claim 8, wherein the knowledge graph has respective nodes for the raw entity and the first group of surrounding contexts, and wherein the one or more additional knowledge graphs respectively have nodes for the associated one or more known entities and the associated one or more respective second groups of known surrounding contexts.

15. A computer program product facilitating a process to determine an entity type of a raw entity, the computer program product comprising a computer readable storage medium having program instructions embodied therewith, the program instructions executable by a processor to cause the processor to:

determine, by the processor, from a plurality of data locations, a first group of surrounding contexts for a raw entity of a software application to be modernized;

match, by the processor, the first group of surrounding contexts with one or more respective second groups of known surrounding contexts of one or more known entities according to a defined threshold;

determining, by the processor, a selected one of the one or more known entities by prioritizing the first group of surrounding contexts based on a defined order of priority for respective data locations from which the first group of surrounding contexts were determined; and identify, by the processor, an entity type for the raw entity based on the selected known entity.

16. The computer program product of claim 15, wherein the program instructions are further executable by the processor to cause the processor to:

apply, by the processor, a determination algorithm to the raw entity to determine whether the raw entity is known or unknown relative to a knowledge base accessible by the processor.

17. The computer program product of claim 15, wherein the program instructions are further executable by the processor to cause the processor to:

generate, by the processor, a knowledge graph for the raw entity based on the first group of surrounding contexts, generate, by the processor, one or more additional knowledge graphs for the one or more known entities based on the one or more respective second groups of known surrounding contexts, and compare, by the processor, the knowledge graph for the raw entity to the one or more additional knowledge graphs.

18. The computer program product of claim 17, wherein the program instructions are further executable by the processor to cause the processor to:

determine, by the processor, the selected known entity as having a respective additional knowledge graph that has more data in common with the knowledge graph of the raw entity than others of the one or more additional knowledge graphs.

19. The computer program product of claim 15, wherein the program instructions are further executable by the processor to cause the processor to:

recommend, by the processor, one or more relationships with respect to the raw entity, the one or more known entities, or one or more additional known or previously unknown entities by analyzing, by the processor, one or more knowledge graphs generated by the processor.

20. The computer program product of claim 15, wherein the program instructions are further executable by the processor to cause the processor to:

generating, by the processor, a container image for a new software application, wherein the generating, by the system, of the container image is unable to be completed absent identifying, by the system, the entity type for the raw entity.

\* \* \* \* \*